US011852545B2

United States Patent
Schricker et al.

(10) Patent No.: US 11,852,545 B2
(45) Date of Patent: Dec. 26, 2023

(54) MEASURING DEVICE AND METHOD FOR DETERMINING A FORCE AND/OR A TORQUE ON A TORQUE-TRANSMITTING SHAFT

(71) Applicants: AVL LIST GMBH, Graz (AT); PIEZOCRYST ADVANCED SENSORICS GMBH, Graz (AT)

(72) Inventors: Alexander Schricker, Graz (AT); Patrick Falk, Graz (AT); Franz Dreisiebner, Graz (AT); Helmut Kokal, Graz (AT); Mario Propst, Obdach (AT)

(73) Assignee: AVL LIST GMBH, Graz (AT)

( * ) Notice: Subject to any disclaimer, the term of this patent is extended or adjusted under 35 U.S.C. 154(b) by 634 days.

(21) Appl. No.: 16/964,484

(22) PCT Filed: Jan. 24, 2019

(86) PCT No.: PCT/AT2019/060028
§ 371 (c)(1),
(2) Date: Dec. 28, 2020

(87) PCT Pub. No.: WO2019/144172
PCT Pub. Date: Aug. 1, 2019

(65) Prior Publication Data
US 2021/0116316 A1 Apr. 22, 2021

(30) Foreign Application Priority Data
Jan. 24, 2018 (AT) .............................. A 50064/2018

(51) Int. Cl.
*G01L 5/00* (2006.01)
*G01L 3/14* (2006.01)
(Continued)

(52) U.S. Cl.
CPC .............. *G01L 5/0019* (2013.01); *G01L 1/16* (2013.01); *G01L 3/108* (2013.01); *G01L 3/1457* (2013.01);
(Continued)

(58) Field of Classification Search
CPC ......... G01L 5/0019; G01L 1/16; G01L 3/108; G01L 3/1457; G01L 3/1464; G01L 5/0042; G01L 5/162; G01L 5/167
See application file for complete search history.

(56) References Cited

U.S. PATENT DOCUMENTS 3,566,163 A 2/1971 Hans et al.
3,614,488 A 10/1971 Sonderegger et al.
(Continued)

FOREIGN PATENT DOCUMENTS

CN 1505750 6/2004
CN 101535789 9/2009
(Continued)

OTHER PUBLICATIONS

Official Action with English Translation for Japan Patent Application No. 2020-540548, dated Aug. 22, 2022, 4 pages.
(Continued)

*Primary Examiner* — Max H Noori
(74) *Attorney, Agent, or Firm* — Sheridan Ross P.C.

(57) ABSTRACT

The invention relates to a measuring device for determining force and/or torque on a torque-transmitting shaft which is supported by a bearing device, in particular a machine, the output and/or input shaft of which is formed by the torque-transmitting shaft. The measuring device has at least two, preferably three or four, piezoelectric elements and a fixing device, wherein the fixing device supports the piezoelements and is designed in such a way that a force, in particular shear force, can be measured between the bearing device and a
(Continued)

US 11,852,545 B2

Figure 1:
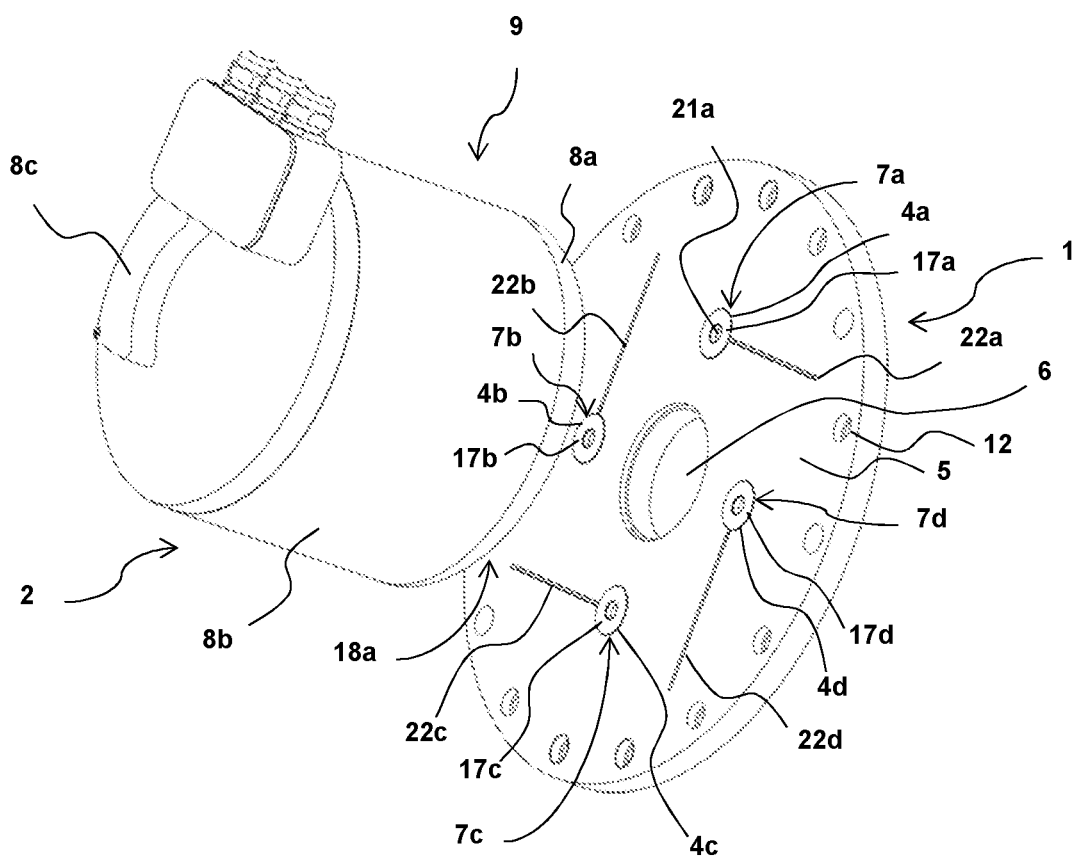

Page 2 supporting device for supporting the bearing device by means of the piezoelements.

39 Claims, 11 Drawing Sheets

(51) Int. Cl.
  *G01L 5/162*  (2020.01)
  *G01L 1/16*  (2006.01)
  *G01L 3/10*  (2006.01)
  *G01L 5/167*  (2020.01)

(52) U.S. Cl.
  CPC .......... *G01L 3/1464* (2013.01); *G01L 5/0042* (2013.01); *G01L 5/162* (2013.01); *G01L 5/167* (2013.01)

(56) References Cited

U.S. PATENT DOCUMENTS

| | | |
|---|---|---|
| 3,640,130 A | 2/1972 | Spescha et al. |
| RE29,755 E | 9/1978 | Perkins et al. |
| 4,148,530 A | 4/1979 | Calderara |
| 4,178,799 A | 12/1979 | Schmieder et al. |
| 4,186,596 A | 2/1980 | Bohringer et al. |
| 4,635,769 A * | 1/1987 | de Hertel Eastcott ...................... F16D 48/066 192/56.3 |
| 4,666,315 A | 5/1987 | Scranton |
| 4,741,231 A | 5/1988 | Patterson et al. |
| 4,759,217 A * | 7/1988 | Brihier .................... G01M 1/20 73/462 |
| 4,802,371 A | 2/1989 | Calderara et al. |
| 4,830,399 A | 5/1989 | Hafner |
| 4,875,365 A | 10/1989 | Powell et al. |
| 4,884,461 A | 12/1989 | Sawicki et al. |
| 4,974,454 A | 12/1990 | Wolfer et al. |
| 4,984,173 A * | 1/1991 | Imam ...................... G01B 21/24 702/56 |
| 5,027,663 A | 7/1991 | Frister et al. |
| 5,154,084 A | 10/1992 | Sonderegger et al. |
| 5,168,758 A | 12/1992 | Wolfer |
| 5,297,430 A | 3/1994 | Sonderegger et al. |
| 5,329,823 A | 7/1994 | Sonderegger et al. |
| 5,513,536 A | 5/1996 | Reger et al. |
| 5,677,487 A | 10/1997 | Hansen |
| 5,677,488 A | 10/1997 | Monahan et al. |
| 5,821,431 A | 10/1998 | Durand |
| 6,279,395 B1 | 8/2001 | Insalaco et al. |
| 6,532,830 B1 | 3/2003 | Jansen et al. |
| 7,059,202 B2 | 6/2006 | Stanos et al. |
| 7,469,593 B2 | 12/2008 | Zumberge et al. |
| 8,015,886 B2 | 9/2011 | Lohr et al. |
| 8,042,413 B2 | 10/2011 | Schaffner et al. |
| 8,113,058 B2 | 2/2012 | Baumgartner et al. |
| 8,662,754 B1 * | 3/2014 | Frederick ............ F16C 32/0622 384/317 |
| 8,720,024 B2 | 5/2014 | Ting et al. |
| 8,854,054 B2 | 10/2014 | Ludwig |
| 9,239,270 B2 | 1/2016 | Ting et al. |
| 9,347,839 B2 | 5/2016 | Kohler |
| 10,151,650 B2 | 12/2018 | Buckley et al. |
| 10,254,183 B2 | 4/2019 | Kohler |
| 10,677,667 B2 | 6/2020 | Cavalloni et al. |
| 11,022,509 B2 | 6/2021 | Cavalloni et al. |
| 11,209,325 B2 | 12/2021 | Cavalloni et al. |
| 11,268,866 B2 | 3/2022 | Adachi |
| 2005/0103556 A1 * | 5/2005 | Peterson ................. B60K 17/00 180/337 |
| 2006/0070461 A1 * | 4/2006 | Delair .................. G01M 13/027 73/862.325 |
| 2015/0276513 A1 | 10/2015 | Kawai |
| 2016/0109311 A1 | 4/2016 | Inazumi |
| 2017/0370789 A1 * | 12/2017 | Klopf .................... G01L 9/0052 |
| 2018/0149530 A1 | 5/2018 | Yamamura |
| 2019/0242768 A1 | 8/2019 | Sonderegger et al. |
| 2019/0263634 A1 * | 8/2019 | Cheng ....................... G01P 3/02 |
| 2019/0368954 A1 * | 12/2019 | Atkins .................... B64C 27/12 |

FOREIGN PATENT DOCUMENTS

| | | |
|---|---|---|
| CN | 101606050 | 12/2009 |
| CN | 103196594 | 7/2013 |
| CN | 106908333 | 6/2017 |
| DE | 1952522 | 11/1970 |
| DE | 3019751 | 12/1981 |
| DE | 19936293 | 2/2001 |
| DE | 10304359 | 11/2003 |
| DE | 102009014284 | 10/2010 |
| DE | 102010024806 | 12/2011 |
| EP | 0266452 | 5/1988 |
| EP | 0342253 | 11/1989 |
| EP | 0459069 | 12/1991 |
| JP | 2000-105171 | 4/2000 |
| JP | 2003-279425 | 10/2003 |
| JP | 2006-322771 | 11/2006 |
| JP | 2007-212314 | 8/2007 |
| JP | 2011-257202 | 12/2011 |
| JP | 2015-166706 | 9/2015 |

OTHER PUBLICATIONS

Official Action for U.S. Appl. No. 16/964,478, dated Sep. 2, 2022 17 pages.
U.S. Appl. No. 16/964,478, filed Jul. 23, 2020, Schricker et al.
International Search Report and Written Opinion for International (PCT) Patent Application No. PCT/AT2019/060027, dated Jun. 6, 2019, 20 pages.
Translated International Search Report for International (PCT) Patent Application No. PCT/AT2019/060027, dated Jun. 6, 2019, 3 pages.
Official Action for Austria Patent Application No. A 50064/2018, dated Aug. 17, 2018, 4 pages.
Translated International Search Report for International (PCT) Patent Application No. PCT/AT2019/060028, dated Jun. 17, 2019, 3 pages.
Official Action with machine translation for China Patent Application No. 201980021621.9, dated Oct. 26, 2021, 13 pages.
Official Action with English Translation for Japan Patent Application No. 2020-540633, dated Jul. 4, 2022, 4 pages.
Official Action for U.S. Appl. No. 16/964,478, dated Jun. 15, 2022 9 pages Restriction Requirement.
Official Action with machine translation for China Patent Application No. 201980021684.4, dated Oct. 19, 2021, 14 pages.
Official Action with Machine Translation for European Patent Application No. 19705906.6, dated Apr. 13, 2023, 8 pages.
Official Action for U.S. Appl. No. 16/964,478, dated Feb. 3, 2023 15 pages.
Official Action for European Patent Application No. 19705905.8, dated Aug. 22, 2023, 14 pages.
Official Action with English Summary for Korea Patent Application No. 10-2020-7024179, dated Jul. 20, 2023, 11 pages.
Official Action for U.S. Appl. No. 16/964,478, dated Aug. 3, 2023 4 pages.

* cited by examiner

MEASURING DEVICE AND METHOD FOR DETERMINING A FORCE AND/OR A TORQUE ON A TORQUE-TRANSMITTING SHAFT

CROSS REFERENCE TO RELATED APPLICATIONS

This application is a national stage application under 35 U.S.C. 371 and claims the benefit of PCT Application No. PCT/AT2019/060028 having an international filing date of 24 Jan. 2019, which designated the United States, which PCT application claimed the benefit of Austria Patent Application No. A50064/2018 filed 24 Jan. 2018, the disclosures of each of which are incorporated herein by reference in their entireties.

The invention relates to a measuring device for determining a force and/or torque on a torque-transmitting shaft which is supported by a bearing apparatus, in particular a machine, the output and/or input shaft of which is formed by the torque-transmitting shaft.

In the regulation of motors, in particular internal combustion engines or electrical machines, it is important to have the most accurate knowledge possible about the torque on the shaft of the motor.

Employing measuring devices having strain gauges or piezoelectric sensors to that end is known from the prior art.

Strain gauges and similar measuring elements generally serve in measuring static forces. Generally speaking, however, measuring systems with measuring elements of this type have a reaction time which is too long for measuring dynamic force paths. In contrast, piezoelectric measuring elements, or piezoelements respectively, are suited to measuring dynamic tensile, compressive and shear forces. They have a broad dynamic range, are rigid, and can also measure highly dynamic forces with concurrently high resolution.

Document EP 0 266 452 A1 relates to a piezoelectric transducer for measuring force and torque which consists of at least two piezoelements as well as at least one carrier plate made of insulating material arranged between them, wherein the piezoelements are crystallographically preorientated with respect to the coordinate system of the carrier plate and fixedly connected to same.

The DE 195 25 22 A1 document relates to a force and torque measuring arrangement consisting of a plurality of force-measuring cells and amplifier arrangements, characterized in that the plurality of force-measuring cells are tightly screwed to a measuring unit between mounting plates and arranged with respect to coordinate axes such that torque formation is possible, whereby the signals from the force-measuring cells are routed to a group of amplifiers for evaluation and their outputs are in turn routed to a group of operational amplifiers, as a result of which both the individual force components as well as the moments of force can be measured.

Document DE 10 2009 014284 B4 relates to a torque sensor consisting of a first and a second disc-shaped fastening flange which are disposed axially opposite one another in parallel and connected together rigidly by a radially inward torque transmission element, wherein the second fastening flange is designed as a measuring flange exhibiting a plurality of recesses and shear force transducers separated from each other by radial stiffening webs on a coaxial circumferential region between its radially outer fastening area and the coaxially inward torque transmission element, wherein the recesses are formed by at least three measuring pockets which are axially open on one side, wherein the base area of the measuring pockets is formed as a flat closed surface representing a uniformly thin, spring-elastic deformation body and the shear force transducers are applied on the base surfaces or the axially opposed outer surfaces of the measuring pockets.

It is a task of the invention to provide improved determination of an applied torque or an applied force on a torque-transmitting shaft. In particular, it is a task of the invention to provide a measuring device, a measuring arrangement and a method in which the measuring device has as little influence as possible, preferably none, in a measurement made on the system under testing.

This task is solved by a measuring device for determining a force and/or a torque on a bearing apparatus of a torque-transmitting shaft, a measuring arrangement having such a measuring device, and a method for determining a torque applied to a torque-transmitting shaft according to the independent claims. Advantageous embodiments are claimed in the subclaims.

A first aspect of the invention relates to a measuring device for determining a force and/or torque on a torque-transmitting shaft which is supported by a bearing apparatus, in particular a machine, the output and/or input shaft of which is formed by the torque-transmitting shaft, wherein the measuring device comprises at least two, preferably three or four, piezoelements and a fixing device, wherein the fixing device supports the piezoelements and is designed such that a force, in particular a shear force, can be measured between the bearing apparatus and a supporting apparatus for supporting the bearing apparatus by means of the piezoelements.

A second aspect of the invention relates to a measuring arrangement for determining a force and/or torque on a torque-transmitting shaft which comprises a measuring device based on the piezoelectric effect, in particular according to one of the preceding claims, a shaft, a bearing apparatus and a supporting apparatus of the bearing apparatus, wherein the bearing apparatus supports the shaft, and wherein the measuring device does not alter the rotating mass of the shaft or a shaft assembly respectively. In particular, the rotating mass of the shaft is independent of the measuring device.

A third aspect of the invention relates to a method for determining a torque applied to a shaft and/or a force applied to a shaft, wherein the torque and/or the force is determined by measuring reactive forces of a bearing of a shaft's bearing apparatus on said bearing apparatus via at least two piezoelements.

A fourth and fifth aspect of the invention relate to a test bench and a vehicle having a measuring device according to the first aspect or a measuring arrangement according to the second aspect.

A sixth and seventh aspect of the invention relate to a computer program containing commands which, when run by a computer, prompt the latter to execute the steps of such a method, and a machine-readable medium on which such a computer program is stored. The computer-readable medium contains commands which, when run by a computer, prompt the latter to execute the steps of a method according to the invention.

The features and advantages described below with respect to the first aspect of the invention also apply to the further aspects of the invention and vice versa.

A fixing device in the sense of the invention serves preferably in bearing, in particular fixing, the piezoelements. Further preferably, the fixing device connects the individual piezoelements, whereby they are held in a relative position to one another. Preferably, the fixing device is an adapter plate, a ring element, a measuring flange or even a mounting bracket. Further preferably, the fixing device can be a component of an existing apparatus, for example a housing, a gearbox or a machine. By furnishing the piezoelements, this then becomes the fixing device of the measuring device.

A piezoelement in the sense of the invention is preferably a measuring element configured to measure a force acting over two areas adjacent the piezoelement. Preferably, a piezoelement consists of the piezoelectric crystal as well as a charge dissipator or electrical circuit respectively.

A measuring device in the sense of the invention is preferably a piezoelectric sensor. In this case, the measuring device serves as the housing of the piezoelements. Alternatively, however, the measuring device can also comprise individual piezoelectric sensors, whereby the piezoelements are arranged in a separate housing.

A machine in the sense of the invention is configured to convert energy, preferably kinetic energy, in particular a rotation, into electrical energy or vice versa, or chemical energy into kinetic energy. A machine within the meaning of the invention preferably exhibits a housing.

A bearing apparatus in the sense of the invention is preferably an apparatus for rotatably supporting a shaft, in particular a roller bearing, ball bearing or slide bearing. Preferably, a bearing apparatus also exhibits a housing. The bearing apparatus itself is preferably also in turn itself supported or mounted. Further preferably, the bearing apparatus according to the invention is a machine or part of a machine.

A supporting apparatus in the sense of the invention is preferably an apparatus for supporting an element against a force and/or a torque acting on said element. A supporting apparatus is to that end preferably configured to provide a so-called reactive force or bearing reaction force respectively. A supporting apparatus within the meaning of the invention serves preferably in supporting the bearing apparatus. Preferably, the supporting apparatus is a bell housing, a drivetrain housing or a base plate.

The term "mountable" within the meaning of the invention means "able to be mounted" or "being mounted."

The term "connectable" within the meaning of the invention means "able to be connected" or "being connected."

The term "introducible" within the meaning of the invention means "able to be introduced" or "being introduced." Preferably, this thereby refers to the transmitting of a force from one body to another body.

The term "supportable" within the meaning of the invention means "able to be supported" or "being supported."

The term "guidable through" within the meaning of the invention means "able to be guided through" or "being guided through."

The term "loadable" within the meaning of the invention means "able to be loaded" or "being loaded."

The term "arrangeable" within the meaning of the invention means "able to be arranged" or "being arranged."

The invention is based in particular on the approach of not measuring forces and/or torques applied to a torque-transmitting shaft directly on said torque-transmitting shaft.

The prior art generally makes use of measuring apparatus screwed or otherwise fixed to the torque-transmitting shaft to measure such forces and/or torques, as described for example in the above-cited DE 10 2009 014284 B4.

In contrast, according to the invention, preferably measured are those forces which are reactive forces of a bearing on a bearing apparatus of the shaft, which is supported by the bearing, and the force exerted by the shaft, or the torque acting on the shaft respectively, is deduced from those forces. In other words, according to the invention, the forces are measured elsewhere in the force transmission path than on the torque-transmitting shaft and the torque acting on the torque-transmitting shaft is determined, in particular calculated, from said forces.

On one hand, due to the strength and rigidity of the piezoelements employed as measuring elements, the bearing apparatus can be preferably completely supported or respectively mounted via the piezoelements. The full load is thus preferably on the piezoelements or secondary force flows can at the least be ignored.

On the other hand, using piezoelements in the measuring enables the registering of highly dynamic changes in force or torque respectively.

Furthermore, since it is not a component part of the rotating shaft, the measuring device does not distort the measurement result. The invention in particular does not alter the moving mass or rotating mass respectively of a torque-transmitting system to be measured, in particular a system to be tested on a test bench. Nor does the measuring device add any elasticities to the torque-transmitting system which would act as vibration dampers or would influence, in particular distort, the natural frequencies of the torque-transmitting system. This is in particular an advantage of piezoelements compared to systems with strain gauges as measuring elements which, due to their design, are relatively flexible compared to piezoelements and thus influence the system under testing.

The inventive measuring device, measuring arrangement and method also eliminate the risk of a measuring device disposed on the torque-transmitting shaft as a measuring flange detaching from said shaft at high rotational speeds.

Furthermore, the solution according to the invention enables analyzing the movement of the torque-transmitting shaft and identifying discontinuities and vibrations in the shaft's motion. In particular, the inventive measuring device, measuring arrangement and method can detect and measure a wobbling of the shaft. This is not possible, or is only possible with difficulty, with a measuring system such as a measuring flange arranged on the shaft. In particular, there is no guarantee that such a measuring flange will be located at that point on the shaft which actually wobbles. The invention is also able to determine the forces which the torque-transmitting shaft exerts on its bearing apparatus and/or a machine, in particular a motor. Such forces cannot be measured with a measuring flange and cannot be determined, or at least not precisely, from the available measurements.

The inventive solution can thus determine dynamic torque applied to the shaft as well as vertical and horizontal vibrations in the shaft.

Also a particular advantage of the invention is particularly that in the case of a motor only supported by the bell housing, as is often the case for example in racing, the forces and torques on the torque-transmitting drive shaft can be determined by the inventive measuring device being arranged between the bell housing and the motor. A further measuring point on the motor or the shaft is then not necessary. The measuring device does not influence the operation of such a drivetrain and can thus be used to diagnose the drivetrain even during operation, for example during a race.

In one advantageous embodiment of the inventive measuring device, the fixing device is further designed such that the force is introducible parallel to the end faces of the piezoelements by way of a non-positive connection. This embodiment provides the possibility of using a piezoelectric shear element as the piezoelement. In particular, a single piezoelement is thereby able to measure forces in two opposite directions without the need for a bonded connection to be established between the end faces of the piezoelements and the respective force-introducing elements.

In a further advantageous embodiment of the inventive measuring device, the piezoelements can be frictionally connected to the fixing device and/or the bearing apparatus and/or the supporting apparatus. A force can thereby be in each case measured between the fixing device and the bearing apparatus or between the fixing device and the supporting apparatus or between the bearing apparatus and the supporting apparatus by means of piezoelectric shear elements.

In a further advantageous embodiment of the inventive measuring device, the piezoelements are configured and/or arranged to measure shear forces between the bearing apparatus and the supporting apparatus and/or are piezoelectric shear elements.

In a further advantageous embodiment of the inventive measuring device, the fixing device is further designed in such a way that the force is measurable at least substantially tangential to the shaft's rotational direction. This simplifies the calculation of a force acting on the shaft and/or a torque acting on the shaft without needing to perform a complex vector analysis of the measured forces.

In a further advantageous embodiment of the inventive measuring device, the fixing device and/or the piezoelements are designed such that the piezoelements can be arranged between the fixing device and the bearing apparatus or between the fixing device and supporting apparatus or between the supporting apparatus and the bearing apparatus and can be loaded with an initial load. In particular, the fixing device and/or the piezoelements specifically have cavities provided for this purpose.

In a further advantageous embodiment of the inventive measuring device, the fixing device is designed such that the bearing apparatus is supported solely by the piezoelements in at least one direction of the shaft's rotation relative to the supporting apparatus. This thus ensures that all of the force to be measured is introduced into the piezoelements.

In a further advantageous embodiment of the inventive measuring device, the piezoelements are multi-component piezoelements which can measure both a shear force as well as a compressive force, preferably at least substantially in the axial direction of the shaft. Thus, both forces in the rotational direction of the shaft as well as the axial direction of the shaft can be measured.

In a further advantageous embodiment of the inventive measuring device, at least two of the piezoelements are shear elements and at least one further piezoelement is a pressure element. This, too, makes it possible to measure forces both normal to the shaft, in particular tangential to the shaft's rotational direction, as well as in the axial direction of the shaft.

In a further advantageous embodiment of the inventive measuring device, the fixing device has an opening through which the shaft can be guided. This makes it possible for the bearing apparatus to be supported from that side at which the shaft also exits the bearing apparatus.

In a further advantageous embodiment of the inventive measuring device, given a measuring arrangement having two piezoelements, a first and a second piezoelement are arranged at least substantially opposite one another with respect to the opening, or in the case of more than two piezoelements, the piezoelements are arranged at approximately the same angular relationship with respect to the opening, preferably relative to a rotational axis of a shaft which can be guided through the opening, wherein preferably the piezoelements are all at the same distance from the center of the opening. These alternative embodiments enable particularly simple calculation of a force applied to the shaft or a torque applied to the shaft.

In a further advantageous embodiment of the inventive measuring device, the piezoelements are more than 50%, preferentially more than 70%, further preferentially more than 90% accommodated in a depression, in particular a blind hole, on the fixing device and/or a housing part of the bearing apparatus and/or the supporting apparatus. The fixing device can thereby serve as the housing of the piezoelements. In particular, the providing of individual housings around each piezoelement can thereby be avoided.

In a further advantageous embodiment of the inventive measuring device, the piezoelements each exhibit a cavity, in particular a hollow cylinder, through which a tensioning screw configured to connect the bearing apparatus to the supporting apparatus can be guided. In particular a pretensioning or respectively preloading can thereby be applied to the piezoelements, whereby a non-positive connection can be established between their end faces and a further element.

In a further advantageous embodiment of the inventive measuring device, the fixing device also exhibits a cavity which aligns with the cavity of the piezoelemente and in which the tensioning screw can be seated. A tensioning screw can thereby also be guided through the fixing device.

In a further advantageous embodiment of the inventive measuring device, the fixing device is an adapter plate or a ring element, in particular for fixing the bearing apparatus to housings of different drivertrain components. This thereby enables particularly universal use of the inventive measuring device across a plurality of motors and/or drivetrains.

In a further advantageous embodiment of the inventive measuring device, the ring element is designed as a seal between two components and/or designed such that it can be used together with a seal. In this advantageous embodiment, the measuring device can be used in an existing sealing groove or guide in such a way that the structure of the surrounding components for measuring the forces only need to be slightly modified. In particular, the rotating mass of the system to be tested is not thereby affected.

In a further advantageous embodiment of the inventive measuring device, the fixing device has at least two mounts supported on the supporting apparatus, wherein the mounts can be arranged, in particular in pairs, on opposite first sides of a housing of the bearing apparatus so that one respective piezoelement in each case lies between the mounts and the housing. This advantageous embodiment is particularly appropriate when the supporting apparatus is formed by a base plate and the bearing apparatus is a motor, in particular an electrical machine, mounted on the base plate.

In a further advantageous embodiment of the inventive measuring device, at least two further mounts can be arranged on opposite sides of a housing of the bearing apparatus such that one respective piezoelement in each case lies between the mount and the housing.

In a further advantageous embodiment of the inventive measuring device, at least three mounts can in each case be arranged on two opposite sides of the housing such that the bearing apparatus can be supported in defined manner.

In a further advantageous embodiment of the inventive measuring device, a further transducer element is in each case arranged between the mount and the supporting apparatus, wherein the further transducer elements are configured to measure tensile and compressive forces between the mounts and the supporting apparatus and are preferably designed as piezoelements or strain gauges. This thereby enables the providing of further measuring elements with which not only dynamic but also static forces as well can be measured by the measuring device.

In one advantageous embodiment of the inventive measuring arrangement, the bearing apparatus is a machine, in particular a dynamometer and/or drive unit, preferably an electric or internal combustion engine. The machine thereby supports the shaft and constitutes a load torque or respectively counter torque for the shaft.

In a further advantageous embodiment of the inventive measuring arrangement, the supporting apparatus is a bell housing. Preferably, the measuring device in this embodiment is designed as a ring element which fits on a sealing surface or the interfaces between the bell housing and the machine. In this particularly advantageous embodiment, the bearing apparatus is supported by the bell housing and requires no further supports. Such a configuration is provided in particular in racing engines. According to the invention, the measuring device can thereby be accommodated in any given system in the area of a sealing groove as is customarily provided between a bell housing and the machine.

In a further advantageous embodiment of the inventive measuring arrangement, a paste is applied between the piezoelements and the fixing device and/or bearing apparatus and/or supporting apparatus for increasing a frictional coefficient. This thereby even better ensures a non-positive connection between the individual aforementioned elements.

In a further advantageous embodiment of the inventive measuring arrangement, the piezoelements between the supporting apparatus and the bearing apparatus are loaded with a pretension of approximately 40 kN to 80 kN, preferably approximately 60 kN. Using these values, the non-positive connection for the specified forces or torques to be measured can be guaranteed particularly well without overloading the pretensioned elements. In particular, shear forces of up to about a tenth of this initial load can be measured.

In a further advantageous embodiment of the inventive measuring arrangement, a housing part of the bearing apparatus also exhibits a cavity which aligns with the cavity of the piezoelement and in which the tensioning screw is supported.

In a further advantageous embodiment of the inventive measuring arrangement, the end faces of the piezoelements are oriented at least substantially parallel to a surface of the bearing apparatus and a surface of the supporting apparatus. This configuration enables a particularly good realizing of a non-positive connection between the elements.

In one advantageous embodiment of the inventive test bench, a first measuring device is arranged on a drive unit and a second measuring device on a dynamometer as a bearing apparatus. Observable by way of such an advantageous embodiment is for example a so-called torque ripple, in which the output torque of an electric motor oscillates when the motor shaft rotates. Torque ripple thereby corresponds to a type of natural vibration of a drive unit, often also called prime mover in this application. Moreover able to be determined are further parasitic influences of the test bench, particularly a dynamometer, which are transmittable to a test object.

In one advantageous embodiment of the method according to the invention, the reactive forces are measured as shear forces on the piezoelements.

In a further advantageous embodiment of the inventive method, the measuring of the reactive forces is preferably realized by means of a measuring arrangement according to the first aspect of the invention, wherein the method comprises the following procedural steps:
    detecting at least one signal of a first piezoelement and one signal of a second piezoelement; and
    deriving a torque acting on the first and the second piezoelement and/or the occurrence of a wobbling and/or a torsional vibration of the shaft from the signals.

As a result of forces being measured at least at two different points by means of two piezoelements of the support of the bearing apparatus according to the invention, other parameters in addition to the torque acting on this point can also be derived. For example, it can be determined on the basis of the forces whether a bend in the shaft induces a wobbling of the shaft which acts on one of the bearing apparatus when the shaft is rotatably supported. Based on possible vibrations, a torsional vibration of the shaft can moreover also be derived from the signals. As already explained in relation to one advantageous embodiment of the test bench, a range of parasitic test bench influences on the actual measurement task can thus be identified.

In a further advantageous embodiment of the inventive method, the piezoelements are oriented at a known preferred direction, in particular the same preferred direction, relative to the rotational direction of the shaft, and the method comprises the further procedural steps:
    totaling the signals corresponding to a component of the preferred direction of the piezoelements; and
    deriving an occurrence of torsional shaft vibration from the signals.

So as to be able to constructively evaluate the signals of the piezoelements in order to identify a torsional vibration of the shaft, it is necessary to know the preferred direction of the individual piezoelements in relation to the rotational direction of the shaft. The occurrence of a torsional vibration can be derived from the overlap of the then normed components in relation to the direction of rotation.

In a further advantageous embodiment of the inventive method, the piezoelements are oriented such that their preferred direction is known, in particular such that their preferred direction is parallel to one another, wherein the method comprises the further procedural steps:
    totaling the signals corresponding to a parallel component of the preferred direction of the piezoelements; and
    deriving the reactive forces of the bearing from the signals.

The total dynamic load acting on the bearing apparatus can be deduced from the summation of the normed parallel components of the individual piezoelements. This can be particularly advantageous in the early detecting of possible wear and the taking of countermeasures as applicable.

In a further advantageous embodiment of the inventive method, a temporal change in at least the values of the derived variables is plotted. Further properties of the test bench components or also parasitic influences of the test bench or other measuring arrangement can be identified from the chronological sequence.

Thus, a further advantageous embodiment of the inventive method comprises at least one of the following procedural steps:
    checking the derived variables for discontinuities in the torque curve;
    checking the derived variables for changes in properties of the system under testing;

projecting the progression of derived variables;
checking a projected course for a possible overload of the bearing device;
reducing an output should a projected overload and/or discontinuities and/or changes in the properties of the system under testing be identified.

This advantageous embodiment relates to the analysis of the system to be tested, in particular a drive unit or respectively prime mover. Preferably, controller adjustment can then regulate the output accordingly should undesired properties be determined in the system under testing. Therefore, this advantageous embodiment relates preferably to a closed control loop.

It is thus possible, for example in the case of a drivetrain, for discontinuities to occur in the torque curve due to production errors in a transmission gear such that a meshing gear pitch error can lead to periodic excessive torque. A change in the elasticity of a shaft or an entire drivetrain can also be determined by observing changes over time. Lastly, the fast measurement response of the piezoelements enables detecting increases in torque and precalculating a further possible future course so as to be able to determine whether a torque could reach a critical range due to the increase and the inertia of the system. Adjusting the output serves here to protect the machine and can prevent serious damage.

Figure 2:
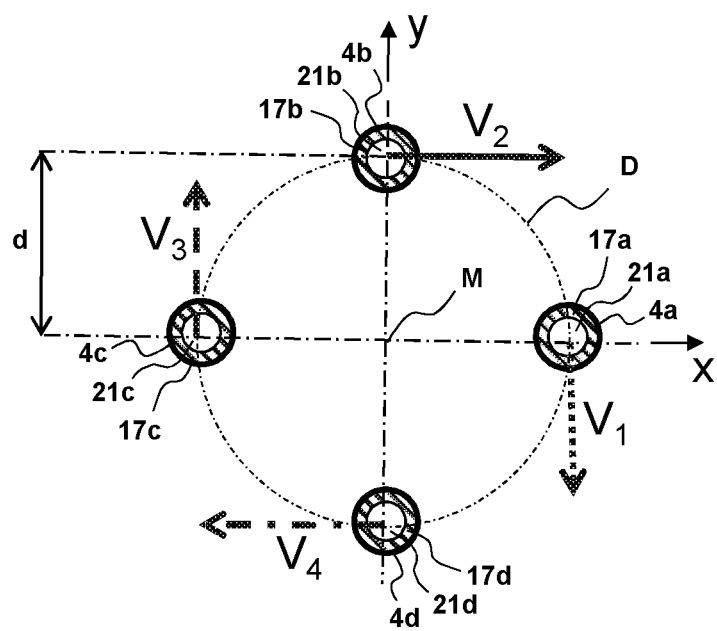
Figure 3:
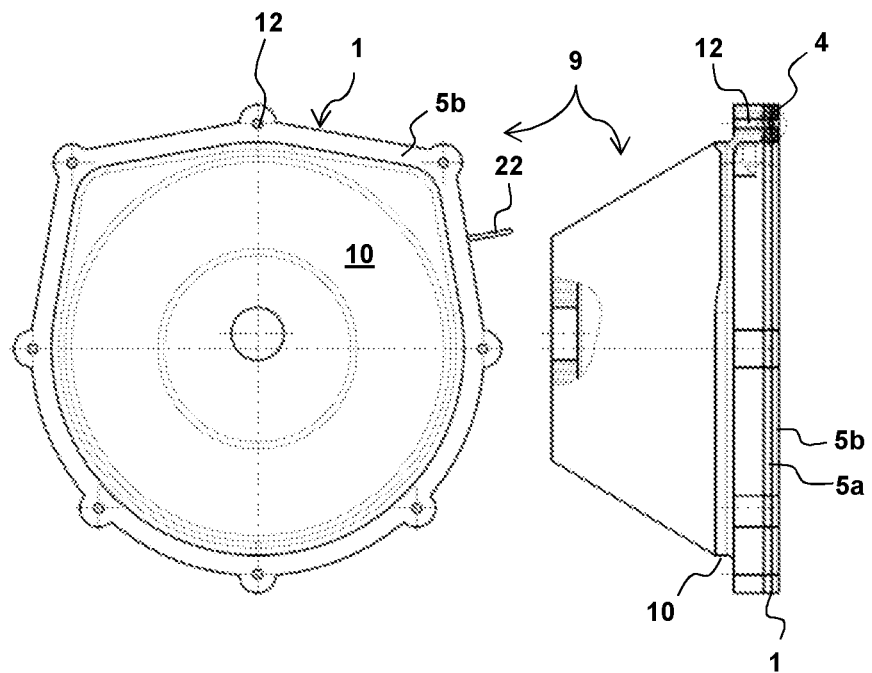
Figure 4:
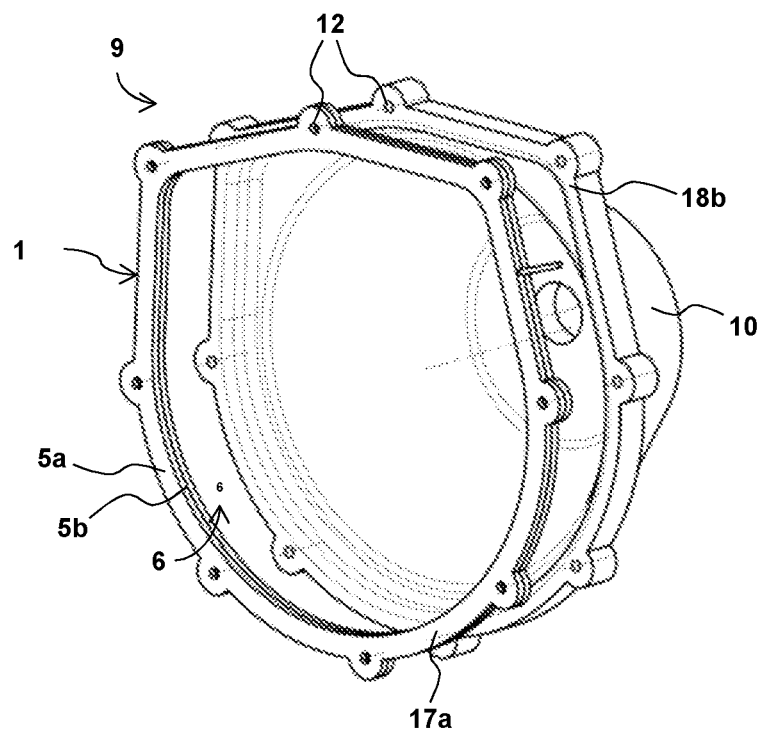
Figure 5:
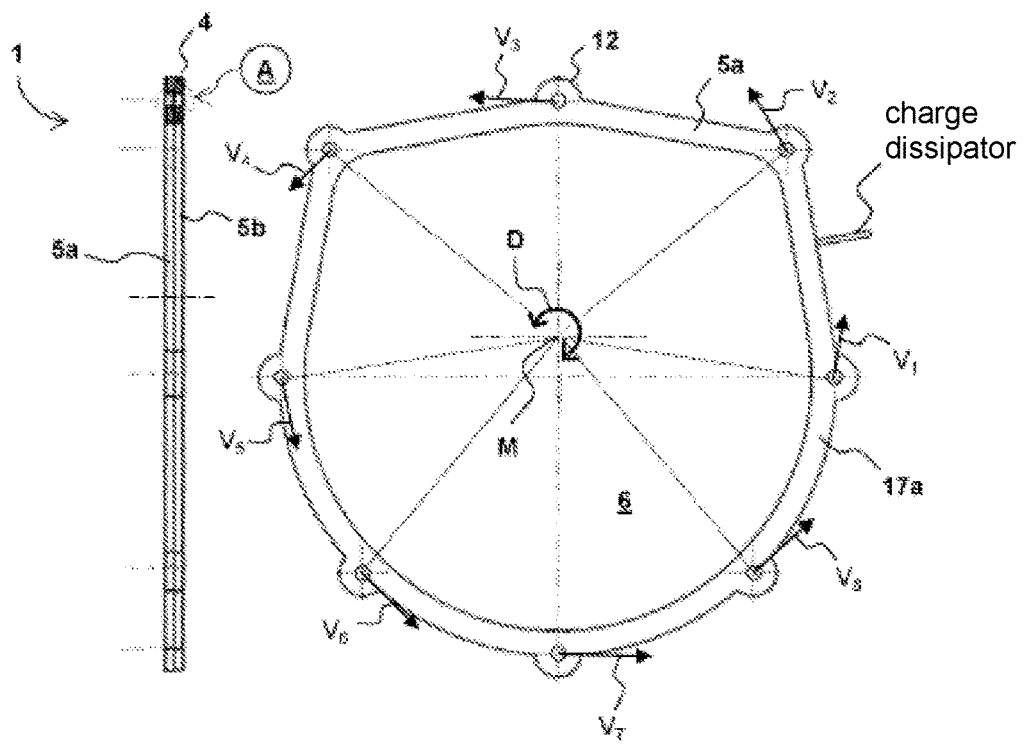
Figure 6:
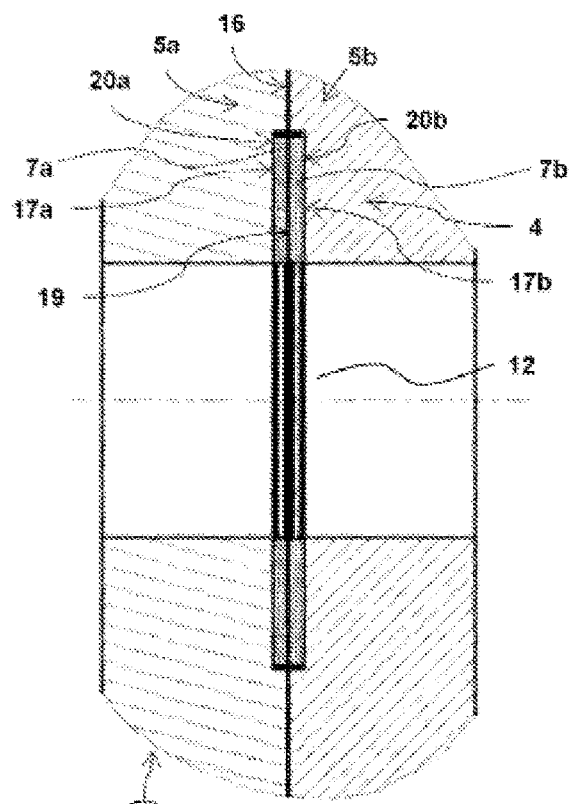
Figure 7:
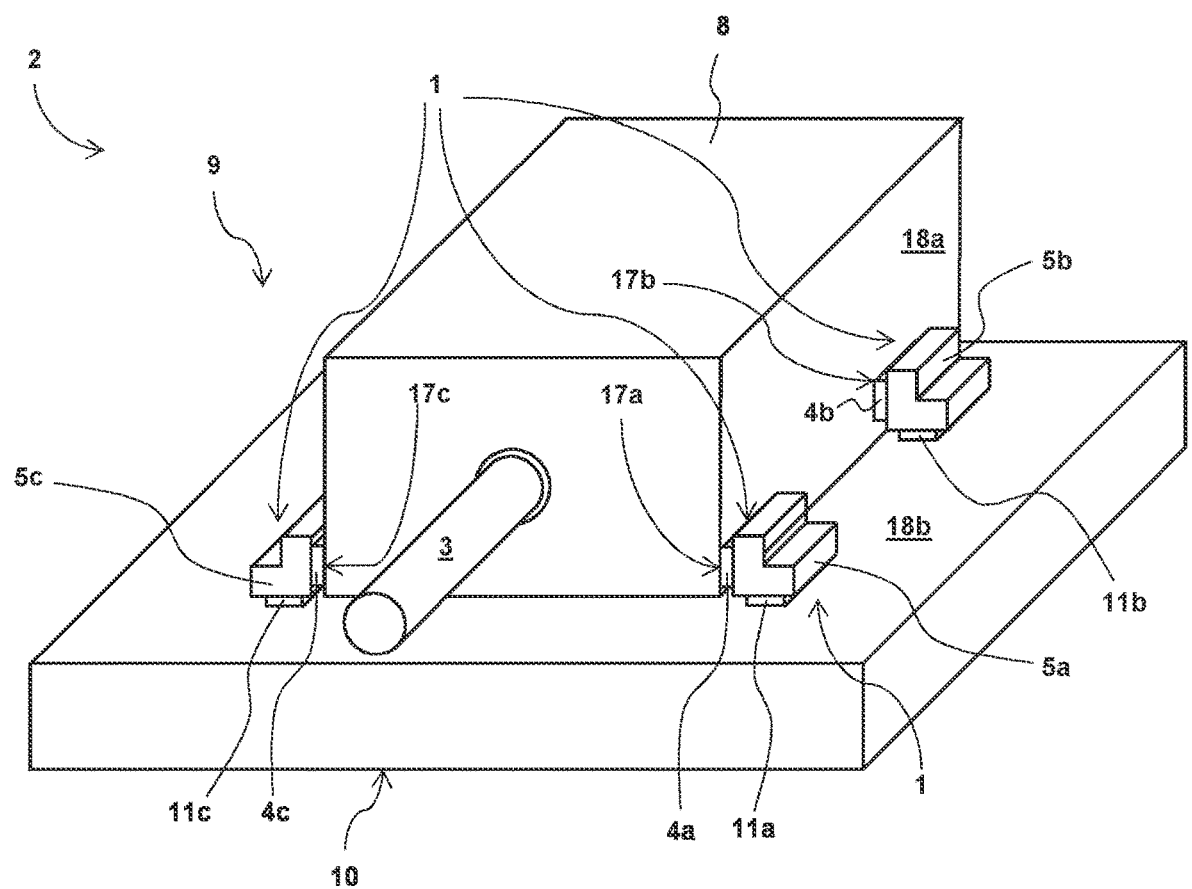
Figure 8:
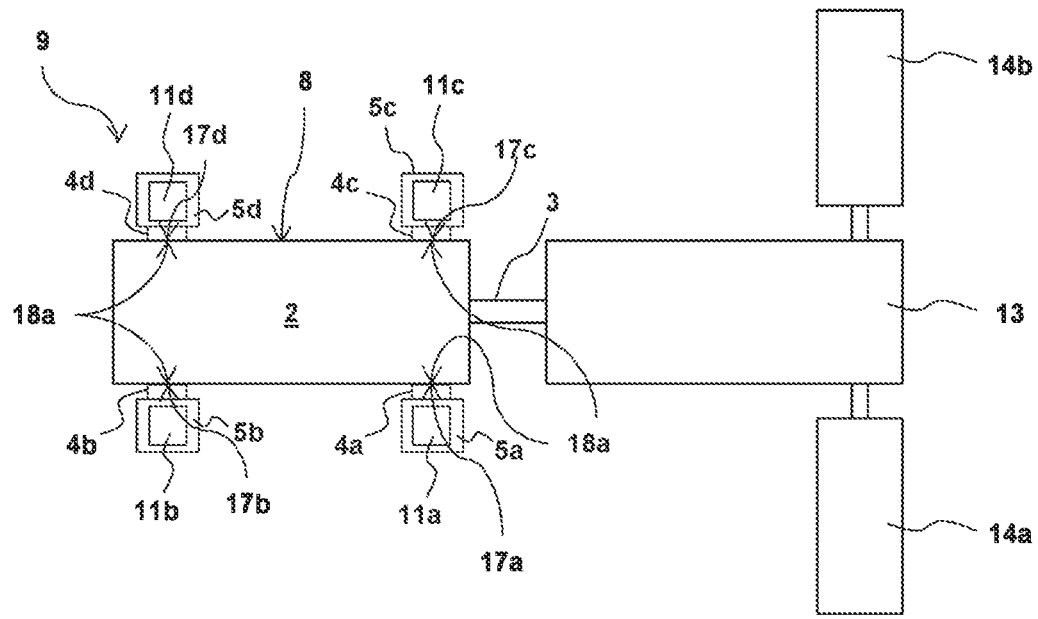
Figure 9:
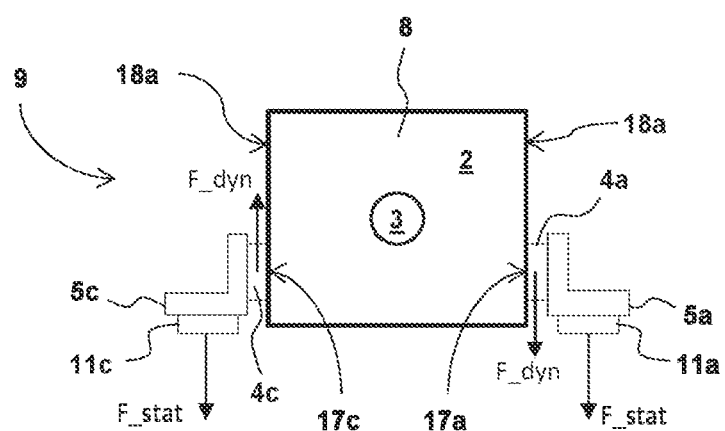
Figure 10:
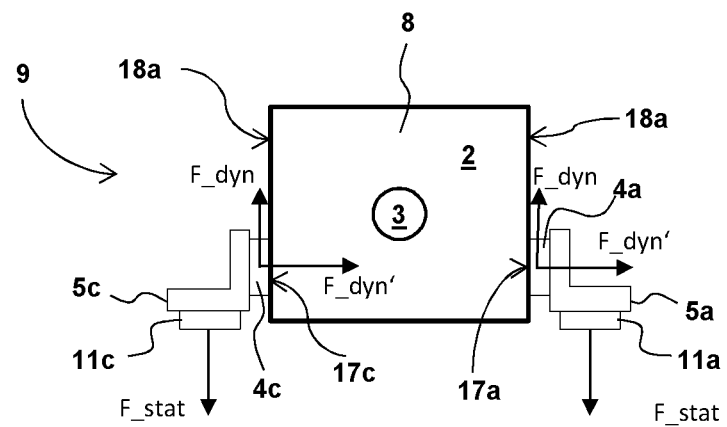
Figure 11:
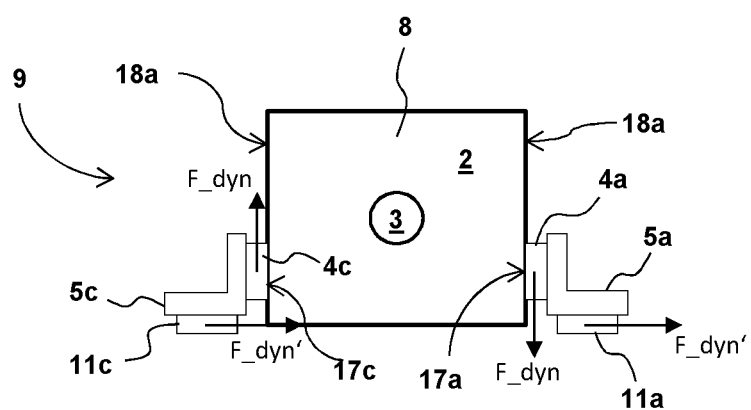
Figure 12A:
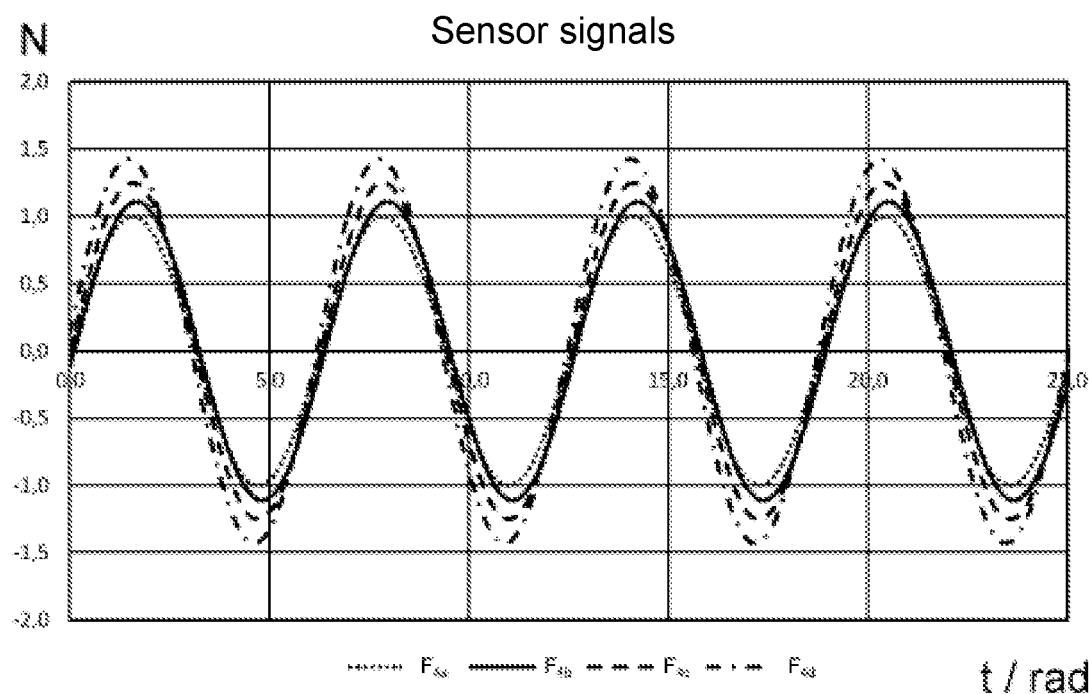
Figure 12B:
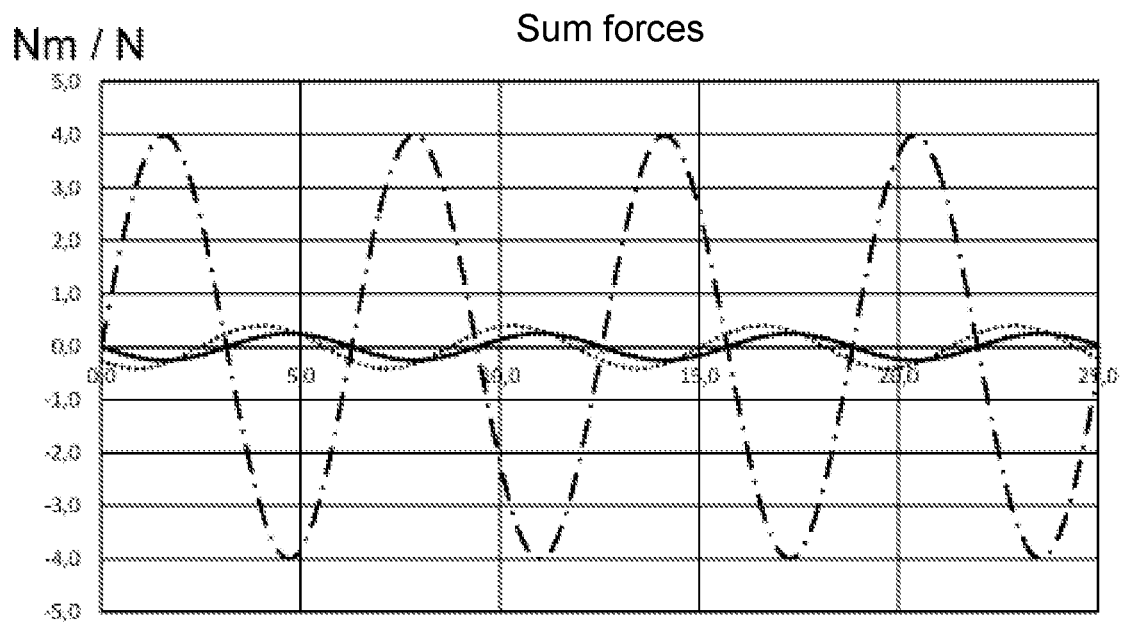
Figure 13A:
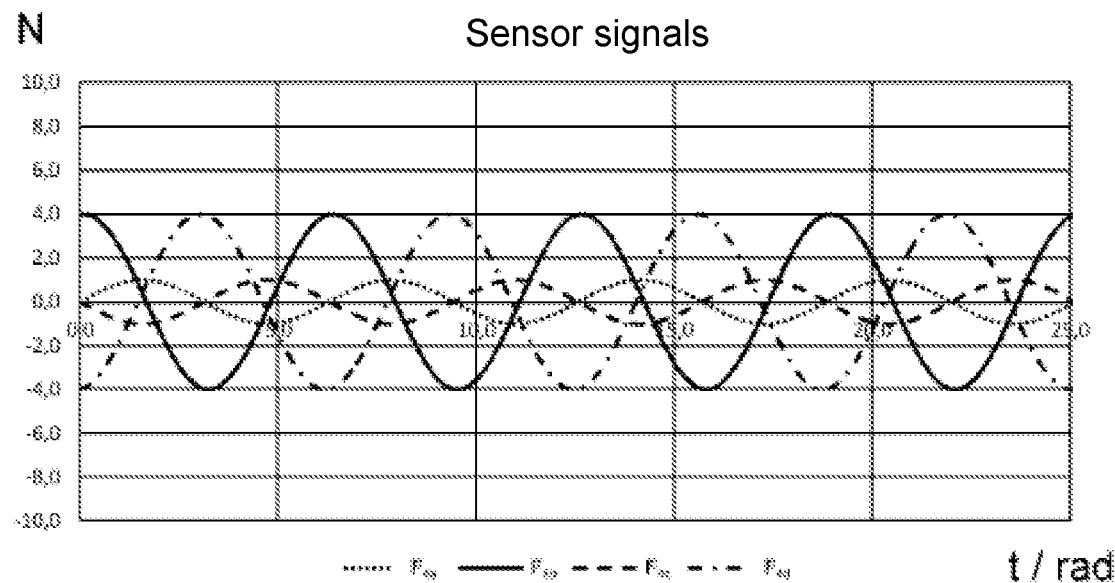
Figure 13B:
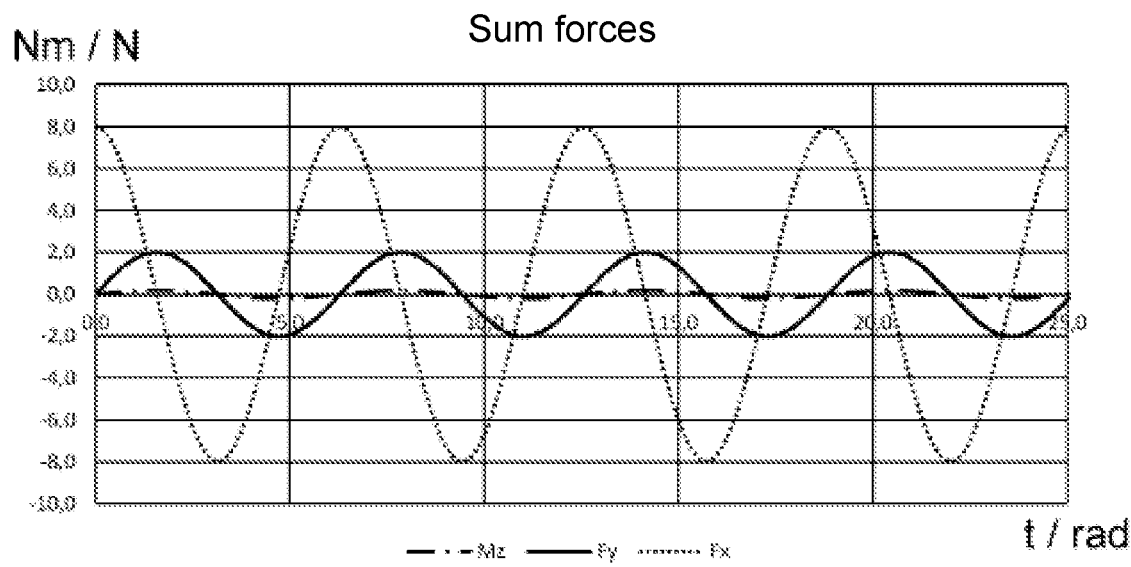
Figure 14:
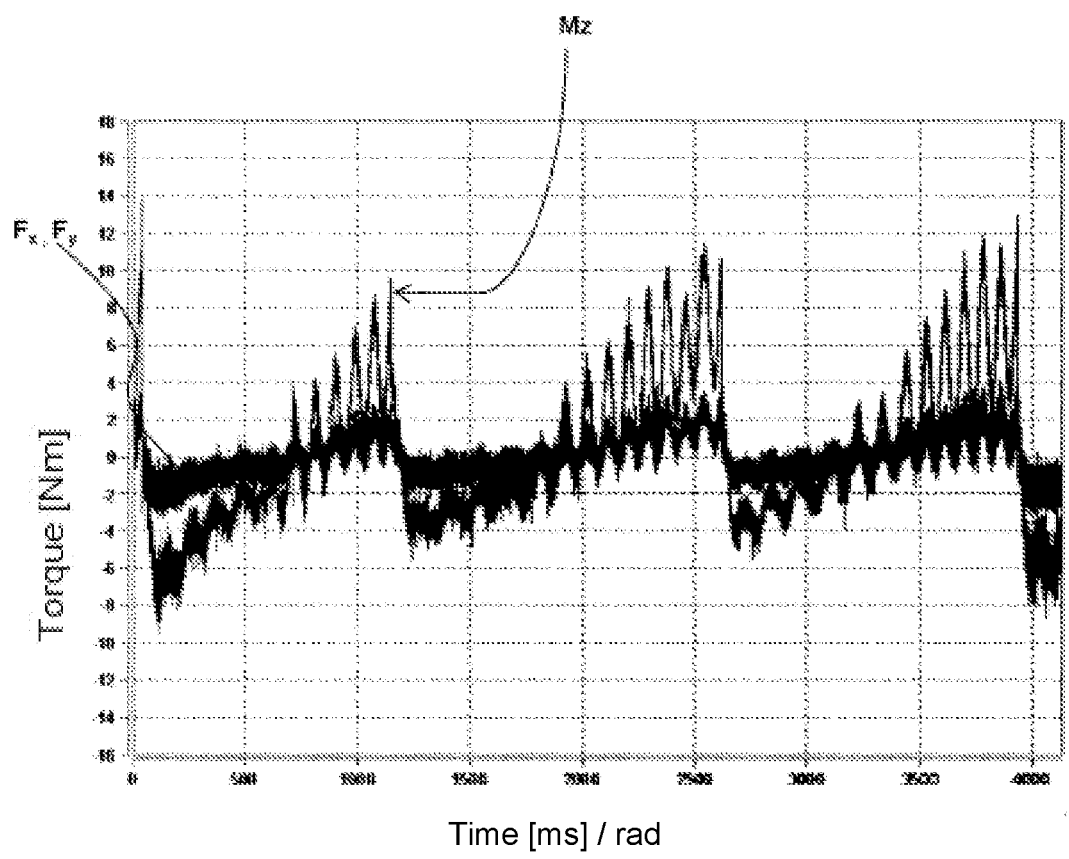
Figure 15:
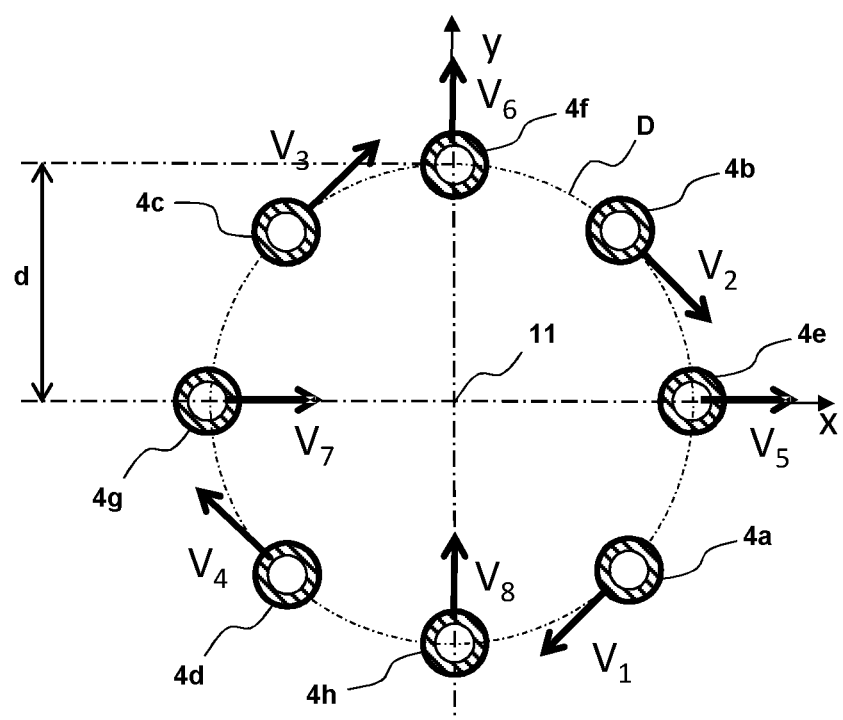
Figure 16:
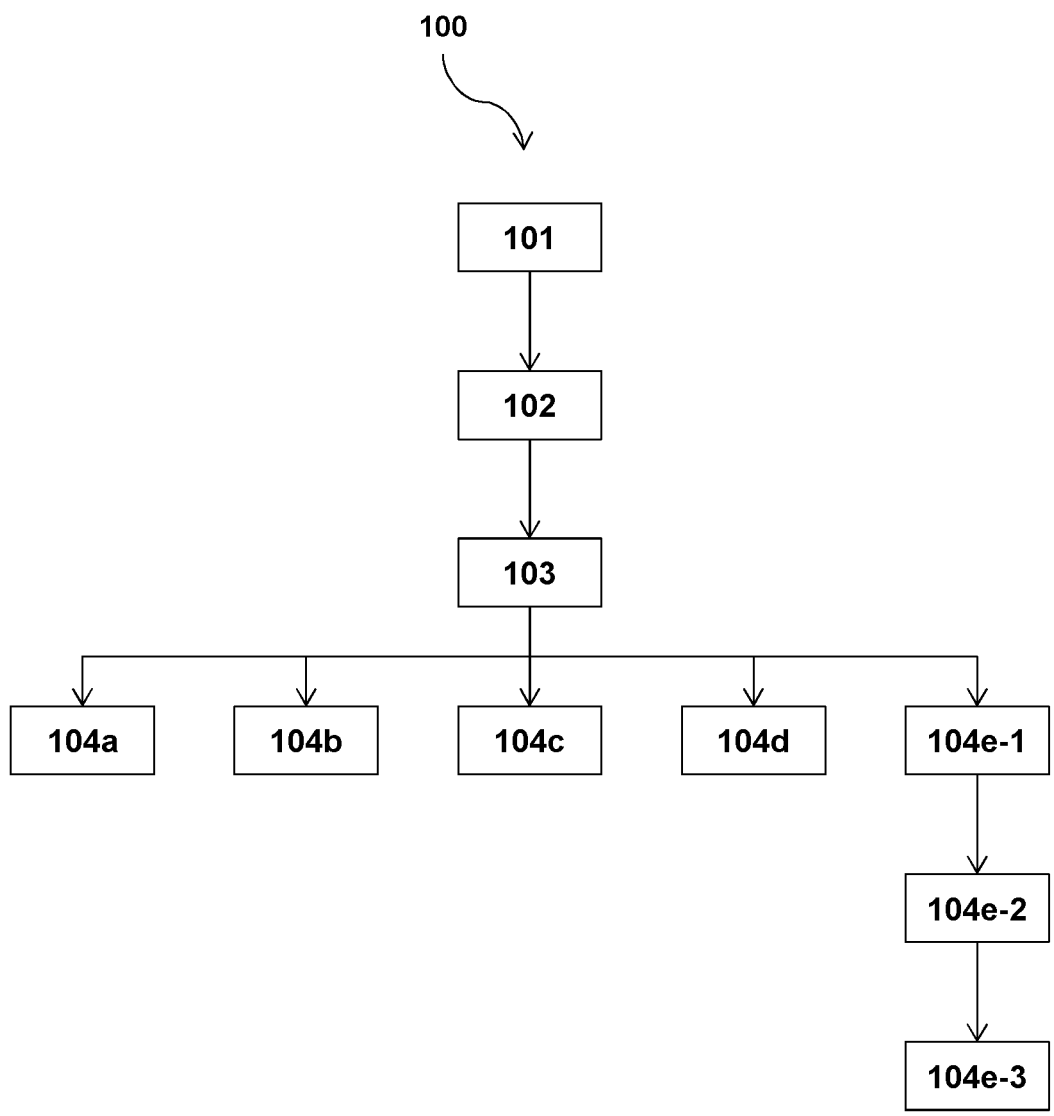

Further advantages and features will become apparent from the preferential exemplary embodiments described below with reference to the figures. The figures show, at least partially schematically:

FIG. 1 a first exemplary embodiment of a measuring arrangement according to the second aspect of the invention together with a first exemplary embodiment of a measuring device according to the first aspect of the invention;

FIG. 2 an arrangement of piezoelements in a measuring device as is present for example in the first exemplary embodiment of the measuring device according to FIG. 1;

FIG. 3 part of a second exemplary embodiment of a measuring arrangement according to the second aspect of the invention together with a second exemplary embodiment of the measuring device according to the first aspect of the invention in plan view and cross-sectional side view;

FIG. 4 an exploded perspective view of the part of the second embodiment of a measuring arrangement according to the second aspect of the invention with the measuring device according to the first aspect of the invention;

FIG. 5 a plan view, respectively cross-sectional side view, of the second exemplary embodiment of a measuring device according to the first aspect of the invention from FIGS. 3 and 4;

FIG. 6 an enlarged view of the area marked with A in the cross-sectional side view from FIG. 5;

FIG. 7 a perspective view of a third exemplary embodiment of a measuring arrangement according to the second aspect of the invention together with a third exemplary embodiment of a measuring device according to the first aspect of the invention;

FIG. 8 a plan view from below of a test bench with part of the third exemplary embodiment of a measuring device according to the second aspect of the invention as per FIG. 7 and with a system to be tested;

FIG. 9 a side plan view of part of the third exemplary embodiment of a measuring device according to the second aspect of the invention as per FIG. 8 from the direction of shaft 3;

FIG. 10 an alternative implementation of the part of the third exemplary embodiment of the measuring device according to the second aspect of the invention as is also shown in FIG. 9;

FIG. 11 a further implementation of the part of the third exemplary embodiment of a measuring device according to the second aspect of the invention as is also shown in FIGS. 9 and 10;

FIG. 12a a chronological progression of measurement signals of an arrangement of measuring elements according to FIG. 2;

FIG. 12b a chronological progression of an evaluation of the measurement signals according to FIG. 12a;

FIG. 13a a further chronological progression of measurement signals of an arrangement of measuring elements according to FIG. 2;

FIG. 13b a chronological progression of an evaluation of the measurement signals according to FIG. 13a;

FIG. 14 a further chronological progression of an evaluation of the measurement signals according to FIG. 12b;

FIG. 15 a further exemplary arrangement of measuring elements in a measuring device according to the first aspect of the invention; and FIG. 16 a block diagram of an exemplary embodiment of an inventive method according to the third aspect of the invention.

FIG. 1 shows a section of a measuring arrangement 9 according to the second aspect of the invention.

A measuring device 1 of the measuring arrangement 9, which is designed as an adapter plate 5, comprises four depressions 7a, 7b, 7c, 7d, in each of which a piezoelement 4a, 4b, 4c, 4d is partially embedded. Furthermore, the adapter plate 5 exhibits cavities 12 designed as bores as well as an opening 6.

FIG. 1 further shows a bearing apparatus 2 which is designed as an electrical machine. However, this could also be an internal combustion engine or another type of machine which generates or receives rotary motion. It has a housing with end face housing parts 8a and 8c as well as a central housing part 8b.

The shaft of the electrical machine 2 axially exits same from end face housing part 8a and is therefore not visible in the perspective view according to FIG. 1.

In the assembled state of the measuring arrangement 9, the adapter plate 1 is screwed into corresponding internally threaded bores of end face housing part 8a of the electrical machine 2 by means of tensioning screws (not shown) guided through bores 21a in the piezoelements 4a, 4b, 4c, 4d as well as the fixing device 5.

Furthermore, the adapter plate 5 is screwed into corresponding likewise internally threaded bores of a supporting apparatus 10 (not shown) by way of the cavities 12. In the exemplary embodiment depicted, the supporting apparatus 10 is preferably a bell housing, also called a clutch bell or clutch housing, which is generally arranged between a motor, here the electrical machine 2, and the vehicle transmission in the drivetrain of a vehicle.

In particular, the adapter plate 5 can be a modified housing part or a modified cover of the bell housing respectively.

In the assembled state, the shaft 3 (not visible) is guided through the opening 6 in the adapter plate, via which it is guided into the gearbox (not shown).

The measuring elements 4a, 4b, 4c, 4d are pressed via end faces 17a, 17b, 17c, 17d against the end face housing part 8a of the electrical machine 2 in force-fit manner by way of a pretensioning generated by the tensioning screws (not shown) and thus form a non-positive connection with the electric motor 2.

On the other side, as previously explained, the adapter plate 5 is connected to a supporting apparatus 10, for example a bell housing, by means of screws through the cavities 12 and is thusly supported on the bell housing 10.

Preferably, the electrical machine 2 exhibits no further supports.

In this case, the total reactive forces of the mounting of the electrical machine 2, which reciprocate a resistance of the electrical machine 2 in relation to torque on the shaft 3 (not shown), are on the non-positive connection between the end face housing part 8a of the electrical machine 2 and the piezoelements 4a, 4b, 4c, 4d.

The torque applied to the shaft 3 (not shown) due to this resistance is expressed by a force acting on the non-positive connection on the end faces 17a, 17b, 17c, 17d of the piezoelements 4a, 4b, 4c, 4d. These piezoelements 4a, 4b, 4c, 4d preferably exhibit at least one piezoelectric shear effect, whereby electrical voltages are generated in the piezocrystals of the piezoelements 4a, 4b, 4c, 4d as a function of an applied shear force.

Preferably, the piezoelements 4a, 4b, 4c, 4d can also be designed so as to be able to measure compressive forces. In one such embodiment, dynamic loads in the axial direction of the shaft (3) (not shown) can also be determined. These can be induced for example by a bent shaft during its rotation, since a force results at the maximum of a bend in the shaft which forces the electrical machine away in the axial direction at the speed of rotation.

The applied electrical voltages are directed to an evaluation device (not shown) via charge dissipators 22a, 22b, 22c, 22d.

FIG. 2 shows an arrangement of the piezoelements 4a, 4b, 4c, 4d as is also depicted in relation to the fixing device 5 of FIG. 1.

Additionally shown by means of arrows is a Cartesian coordinate system with x and y axes and a respective preferred direction $V_1$, $V_2$, $V_3$, $V_4$ of the piezocrystals used in the piezoelements 4a, 4b, 4c, 4d.

The respective preferred direction $V_1$, $V_2$, $V_3$, $V_4$ thereby indicates which direction of piezoelement loading generates the strongest voltage in the piezocrystal, in particular by means of a shear force on the end faces 17a, 17b, 17c, 17d.

Further depicted is the distance d from the center points of the piezoelements 4a, 4b, 4c, 4d to the geometric center M of the arrangement.

In the first exemplary embodiment of the measuring device 1 shown in FIG. 1, the geometric center point M also indicates the position of the shaft 3 (not shown) of the electrical machine 2 in relation to the arrangement of piezoelements 4a, 4b, 4c, 4d. The distance d is thereby that distance from the geometric center, area centroid or also center of mass M to the geometric center, area centroid or center of mass of the individual piezoelements 4a, 4b, 4c, 4d.

In this case, the circle D indicated by a dashed/dotted line, which is arranged concentrically to the geometric center M and thus to the shaft 3 in FIG. 1 (not depicted), corresponds to the rotational direction of a shaft 3 (not depicted). The preferred direction of the piezoelements 4a, 4b, 4c, 4d or their crystals respectively are thus all tangential to the direction of rotation D of a shaft 3 running through the geometric center M perpendicular to the viewing plane of FIG. 2.

As shown in the first exemplary embodiment of the measuring device 1 in FIG. 1, each of the piezoelements 4a, 4b, 4c, 4d exhibit an opening or respectively bore 21a, 21b, 21d, 21c, through which a tensioning screw or another tensioning element can be guided.

FIG. 3 shows a second exemplary embodiment of a measuring arrangement 9 having a measuring device 1 and a supporting apparatus 10, designed in this case as a bell housing, in plan view and in a cross-sectional side view.

The bell housing 10 exhibits a taper widening toward the installation side of the motor (not depicted). The bell housing 10 is fixed to a motor (not depicted) via cavities 12 by way of a screw. In plan view, the bell housing 10 exhibits the approximate shape of a closed horseshoe in the area of a flange which, in the mounted state, bears against a motor (not depicted).

The measuring device, which in this exemplary embodiment is designed as a type of washer or intermediate element to be arranged between the bell housing 10 and a motor (not depicted), exhibits the same shape as the flange of the bell housing and also the same cavities 12 through which fixing screws (not depicted) can be guided. These fixing screws preferably constitute tensioning screws in relation to the measuring device 1, with which a non-positive connection can further preferably be realized in the region of piezoelements 4.

The fixing apparatus 5a, 5b of the measuring device 1 in this second exemplary embodiment of the measuring device 1 is preferably of two-piece configuration, as will be explained in greater detail below. The piezoelements 4 are preferably arranged in the area of each of the cavities or bores 12 in the two parts 5a, 5b of the fixing device 5 and are supported by the fixing device 5a, 5b. Preferably, there are thus eight piezoelements in the depicted exemplary embodiment. More or fewer piezoelements can however also be provided, particularly also between the positions of the cavities 12 of the intermediate element.

In the second exemplary embodiment of the measuring arrangement 9, the measuring device 1 is arranged on the flange of the bell housing when the bell housing 10 is attached preferably to a motor (not depicted) and is screwed together with the bell housing to the housing of the motor (not depicted) via the connecting screws (not depicted).

The individual piezoelements 4 are connected to electrical lines in the fixing device 5 and connected to measuring electronics preferably arranged outside the measuring device via such an electrical line 22. Alternatively, however, at least part of such measuring electronics could also be a component of the measuring device 1.

FIG. 4 again shows an exploded perspective view of part of the measuring arrangement 9 according to FIG. 3.

Clearly recognizable here is opening 6 formed by the fixing device 5a, 5b and through which a shaft 3 (not depicted) of a bearing apparatus 2 designed as a motor (not depicted) can be guided in order to be connected to the gearbox.

FIG. 5 shows a plan view as well as a cross-sectional view of the second exemplary embodiment of the measuring device 1, which is also depicted in conjunction with the second exemplary embodiment of the measuring arrangement 9 in FIG. 3 and FIG. 4.

In one preferential embodiment of this second exemplary embodiment, the piezoelements or respectively their piezocrystals 20a, 20b exhibit preferred directions $V_1$, $V_2$, $V_3$, $V_4$, $V_5$, $V_6$, $V_7$, $V_8$ which are oriented in the rotational direction D of a shaft 3 (not depicted); i.e. tangential to a concentric circle about a rotational axis of the shaft 3. The rotational direction D is indicated in FIG. 5 by a double arrow. A shaft 3 (not depicted) can thereby rotate both clockwise as well as counterclockwise in rotational direction D.

Alternatively, the preferred direction $V_x$ of the individual piezoelements 4 can also be oriented in any desired or other defined manner. Some alternatives are illustrated below as examples with respect to the following exemplary embodiments.

FIG. 6 shows an enlarged view of area A in the cross-sectional view of FIG. 5. The annular piezoelement 4, which is arranged around cavity 12, preferably comprises two piezocrystals 20a, 20b in contact with each other via an electrode 19. The electrode 19 thereby serves in charge dissipation or respectively voltage metering between the two crystals. In addition, further electrodes are preferably arranged on the end faces 17a, 17b of the piezocrystals. Further preferably, these electrodes are formed by a respective part of the fixing device 5a, 5b.

The left piezocrystal 20a is arranged in a depression 7a of the left part 5a of the fixing device, the right piezocrystal 20b is arranged in a depression 7b of the right piezocrystal. Both piezocrystals 20a, 20b thereby protrude slightly above the surface of the respective part of the fixing device 5a, 5b from the respective depressions 7a, 7b so that a sealing gap 16 is formed or respectively remains between the two parts of the fixing device 5a, 5b in the assembled state. Preferably, only a single recess 7a can also be provided.

Should the measuring device 1 be installed in a measuring arrangement 9 as shown for example in FIGS. 3 and 4, preferably a tensioning means (not depicted), in particular a tensioning screw, guided through the cavity 12 presses both parts of the fixing device 5a, 5b together. The applied preload produces a non-positive connection in each case between the left piezocrystal 20a and the left part of the fixing device 5a and the right piezocrystal 20b and the right part of the fixing device 5b.

Since the rest of the intermediate surface of the left part 5a and right part 5b of the fixing device are still separated by the sealing gap 16, both parts 5a, 5b of the fixing device are supported solely by the end faces 17a, 17b of the piezocrystals 20a, 20b. A shear force and/or a further dynamic compressive force is also exerted on the piezocrystals 20a, 20b of the piezoelement 4 via these two end faces.

In one alternative embodiment of this second exemplary embodiment, which is however also applicable to the other exemplary embodiments, the piezoelement 4 can also have a single piezocrystal 20.

FIG. 7 shows a third exemplary embodiment of an inventive measuring arrangement 9.

In this exemplary embodiment, the bearing apparatus 2 is a dynamometer and/or drive unit, a so-called prime mover, of a drivetrain or engine test bench.

The third exemplary embodiment of the measuring device 5a, 5b, 5c, 5d (not visible) likewise shown here is in principle also applicable to other types of measuring arrangements as test stands.

The electrical machine 2, which comprises the output and/or input shaft 3, is supported by means of the measuring device 1 on a base plate 10, which in this exemplary embodiment forms the supporting apparatus.

The measuring device 1 consists of four parts to that end. These parts each comprise a piezoelement 4a, 4b, 4c, 4d, a fixing device 5a, 5b, 5c, 5d designed as a mount as well as a further transducer element 11a, 11b, 11c, 11d.

Two of the support elements 5a, 5b, 5c, 5d are preferably arranged opposite each other on the housing 8 of the electrical machine 2, in the present case in respective pairs of a first mount 5a opposite a third mount 5c and a second mount 5b opposite a fourth mount 5d (not visible).

Both pairs of mounts can be pretensioned or preloaded against the housing 8 of the electrical machine 2 by means of a suitable device on the base plate 10, which forms a common base, so that a non-positive connection is established between the piezo-elements 4a, 4b, 4c, 4d, which are arranged between the housing and the respective mounts 11a, 11b, 11c, 11d, and the housing 8, or between the piezoelements 4a, 4b, 4c, 4d and the respective mount 11a, 11b, 11c, 11d by means of which the electrical machine 2 can be held in a position distanced from the base plate 10. Preferably, a paste is applied to that end to the end faces of the piezocrystals which increases the coefficient of friction to improve the non-positive connection.

For example, such a paste can be applied between the first piezoelement 4a and the second piezoelement 4b and a surface 18a of the housing 8 of the electrical machine 2. Preferably, the paste is additionally also applied at a respective angle 11a, 11b between the first piezoelement 4a and the second piezoelement 4b.

The mounts 11a, 11b, 11c, 11d (not visible) are in turn supported on the base plate 10. Preferably, further transducer elements 11a, 11b, 11c, 11d are in each case arranged between the mounts 11a, 11b, 11c, 11d and the base plate 10 to that end. Further preferably, these further transducer elements 11a, 11b, 11c, 11d are based on strain gauges or further piezoelements.

They are preferably supported on the surface 18b of the base plate 10.

The mounts 5a, 5b, 5c, 5d of the measuring device 1 could alternatively or also additionally be arranged on the two end faces of the housing 8 of the electrical machine 2 and form a non-positive connection there with these surfaces, e.g. the surface from which the shaft 3 protrudes, by means of the depicted piezoelements or further piezoelements.

FIG. 8 shows a test bench with the measuring arrangement 9 according to FIG. 7 as per the third exemplary embodiment, whereby the measuring arrangement is connected via the shaft 3 to the rest of a drivetrain which comprises an aggregate of gearbox and differential 13 and two wheel dynamometers 14a, 14b.

The base plate 10 from FIG. 7 is not depicted in FIG. 8 for the sake of clarity, the arrangement of electrical machine 2 and measuring device 1 corresponds to a FIG. 7 view from below.

A torque acting on the shaft 3 is supported by the electrical machine 2 and the measuring device 1 on the base plate. The base plate 10 therefore provides a reactive force for a torque ensuing between the electrical machine 2 and the resistance of the wheel dynamometers 14a, 14b on the shaft 3.

As previously described with reference to FIG. 7, the electrical machine 2 for implementing the inventive measurement method according to the third aspect of the invention is clamped between the mount pairs 5a, 5c and 5b, 5d such that a non-positive connection is formed between the surfaces, in particular end faces, 17a, 17b, 17c, 17d of piezoelements 4a, 4b, 4c, 4d, and the surfaces 18a of the electrical machine 2 and/or the surfaces, in particular end faces, 17a, 17b, 17c, 17d, of piezoelements 4a, 4b, 4c, 4d and a respective surface of the mount 11a, 11b, 11c, 11d. The forces on the piezoelements 4a, 4b, 4c, 4d exerting the applied torque on the piezoelements 4a, 4b, 4c, 4d on the shaft 3 and therefore on the electrical machine 2 can thus be measured by making use of the piezoelectric shear effect.

Furthermore, additional shear forces and/or compressive forces, in particular static compressive forces, can be measured between the mounts 5a, 5b, 5c, 5d and the base plate 10 (not shown) by means of the further transducer elements 11a, 11b, 11c, 11d.

FIGS. 9, 10 and 11 each depict a view of the third exemplary embodiment of the measuring arrangements 9 of FIGS. 7 and 8 on the side with the shaft 3. Only the first mount 5a and the third mount 5c as well as the other corresponding elements associated with the measuring device 1 are therefore visible. The other elements of the measuring device 1 are hidden behind.

FIGS. 9, 10 and 11 serve the purpose of illustrating various alternatives of force measurement able to be realized with the piezoelements 4a, 4b, 4c, 4d as well as the further transducer elements 11a, 11b, 11c, 11d.

In FIG. 9, a respective dynamic force $F_{-dyn}$ parallel to the surface 18a of the housing 8 of the machine 2 can be measured by means of the piezoelectric shear effect via the piezoelements 4a, 4c. The further transducer elements 11a, 11c are in contrast designed as measuring sensors having strain gauges and can thus instead measure static forces $F_{-stat}$ exerted by the mounts 5a, 5c on the base plate 10 (not depicted). Not just variations in torque can be observed by measuring the static forces over the mounts 5a, 5c via the transducer elements 11a, 11c. An absolute value of the torque 3 can also be determined by means of the differences in force on the transducer elements 11a, 11c due to torque applied to the shaft 3.

FIG. 10 differs from the embodiment of FIG. 9 in that the piezoelements 4a and 4c not only measure the dynamic forces $F_{-dyn}$ parallel to the surfaces 18a of the housing 8 of the machine 2 but also additionally the dynamic forces $F_{-dyn'}$ perpendicular to the surfaces 18a.

For example, a wobbling of the shaft 3 in direction $F_{-dyn}$, $F_{-dyn'}$ can thereby be measured since it produces different compressive forces on the piezoelements 4a, 4c depending on the rotational position of the shaft 3.

FIG. 11 differs from the embodiment of FIG. 9 in that the further transducer elements 11a, 11c are likewise designed as piezoelements. If, as shown in FIG. 11, these are designed for example as piezoelectric shear elements, a dynamic shear force $F_{-dyn}$, $F_{-dyn'}$ can then be measured between the mounts 5a, 5c and the base plate 10 (not shown). As shown in the FIG. 10 embodiment, this can also be used to determine and analyze wobbling of the shaft 3.

FIG. 12a shows a diagram of a force measurement on four measuring elements 4a, 4b, 4c, 4d over time t or a rotational angle rad of the shaft in an arrangement of measuring elements 4a, 4b, 4c, 4d, as shown in FIG. 2, wherein the shaft 3 runs through the geometric center M perpendicular to the viewing plane, as also described by way of example with reference to FIG. 2.

Each of the measuring sensors generates a signal corresponding to a force in newtons N at each point in time shown. $F_{4a}$ thereby identifies the measurement signal of measuring element 4a, $F_{4b}$ identifies the measurement signal of the second measuring element 4b, $F_{4c}$ identifies the measurement signal of the third measuring element 4c, and $F_{4d}$ identifies the measurement signal of the fourth measuring element 4d.

In the case of pure torsional vibration, each of the measurement signals in reality has the amplitude of 1. This amplitude was slightly modified for measurement signals $F_{4b}$, $F_{4c}$, and $F_{4d}$ by factor multiplication in order to ensure a clearer depiction in FIG. 12a.

The measurement signals $F_{4a}$, $F_{4b}$, $F_{4c}$ and $F_{4d}$ are furthermore slightly out of phase with each other.

FIG. 12b shows an analysis of the measurement signals $F_{4a}$, $F_{4b}$, $F_{4c}$ and $F_{4d}$. The individual forces $F_{4a}$, $F_{4b}$, $F_{4c}$, $F_{4d}$ applied to the respective measuring elements 4a, 4b, 4c, 4d were first added together and the total on a fixing device 5 supporting the measuring elements 4a, 4b, 4c, 4d calculated, whereby the distance d from the geometric center M in FIG. 2 was assumed to be 1.

This total torque is depicted as curve Mz in the diagram according to FIG. 12b, with the unit Nm over the time t or the rotational angle rad of shaft 3 respectively.

It can be seen from the strong oscillation that strong torque fluctuations of 4 Nm to −4 Nm were periodically acting on the shaft during the measurement period.

The curve $F_x$ represents a chronological sequence of the force applied to the piezoelements $F_{4a}$, $F_{4b}$, $F_{4c}$, $F_{4d}$ in the x-direction in FIG. 2.

Since the second measuring element 4b and the fourth measuring element 4d with their preferred directions $V_2$, $V_4$ are each oriented in the x-direction of the Cartesian coordinate system in the arrangement depicted in FIG. 2, the forces in this direction are in particular measured by these two measuring elements 4b, 4d. When a force is applied in this direction, no significant or even any contribution is made by the first measuring element 4a and the third measuring element 4c, their preferred direction $V_1$, $V_3$ being oriented parallel to the y-axis of the Cartesian coordinate system.

The same applies to the first measuring element 4a and the third-to-last measuring element 4c relative to the y-direction of the Cartesian coordinate system such that the measured force in the y-direction $F_Y$ is measured substantially by these two measuring elements 4a, 4c.

Depending on whether the preferred directions $V_2$, $V_4$ of the second and fourth measuring elements 4b, 4d are opposing or parallel, the measured signals $F_{4b}$, $F_{4d}$ need to be added or subtracted to form the sum forces. The same applies to the forces determined by the first and third measuring sensors 4a, 4c, or their measurement signals $F_{4a}$, $F_{4d}$ respectively, relative to the sum force $F_Y$ in the y-direction of the Cartesian coordinate system according to FIG. 2.

As can be seen in FIG. 12b, only small forces arise in the x-direction and y-direction of the Cartesian coordinate system, each oscillating around the zero point. The shaft 3 therefore only exhibits very weak wobbling. This is caused by the slight phase shift of measurement signals $F_{4a}$, $F_{4b}$, $F_{4c}$, $F_{4d}$.

To determine the sum forces as per FIG. 12b, it is not absolutely necessary for the preferred directions $V_1$, $V_2$, $V_3$, $V_4$ to be oriented tangential to the rotational direction D. The orientation of the preferred direction $V_1$, $V_2$, $V_3$, $V_4$ should, however, be known so that the sum forces in the individual directions and the torque can be respectively concluded via vector component calculation.

FIG. 13a shows a further diagram of measurement signals $F_{4a}$, $F_{4b}$, $F_{4c}$, $F_{4d}$ as recorded with an arrangement of measuring elements 4a, 4b, 4c, 4d as shown in FIG. 2.

The respective measurement signals exhibit different amplitudes and are in phase opposition. They can thus be clearly recognized as separate curves. Here as well, a slight phase shift was made as in FIG. 13a for better illustration. Conversely, the measurement signals $F_{4a}$, $F_{4b}$, $F_{4c}$, $F_{4d}$ were not multiplied by a factor as in FIG. 13a.

FIG. 13b shows a diagram corresponding to FIG. 12b in which a respective summation was in each case made of the individual torques applied to the measuring elements as well as a total torque Mz and a summation of the forces in the x-direction $F_x$ and a summation of the forces in the y-direction $F_y$. It is clear from this diagram that there was only a slight fluctuation around the zero point of the total torque Mz during the measurement period. The shaft 3, in contrast, wobbled, particularly in the x-direction, less in the y-direction.

FIG. 14 shows a further summation of the measurement signals of the measuring elements 4a, 4b, 4c, 4d of an arrangement as per FIG. 2 according to FIGS. 12b and 13b as a diagram over time t or the rotational angle rad of the shaft 3.

It is clear from the diagram that in particular the total torque Mz increasingly oscillates over a period of approximately 1000 ms and then the oscillation abruptly drops again so as to then again increase over a period of another approximate 1000 ms.

In technical terminology, such a sequence is referred to as the so-called torque ripple. This torque ripple denotes poor regulation of an electrical machine, for example a prime mover, such that natural oscillations build up.

A plurality of such properties of a motor or even a test bench can be determined or analyzed using the inventive measuring device 1, measuring arrangement 9 and the method according to the invention.

The previously described exemplary embodiments are merely examples which are in no way to be limiting of the protective scope, application and configuration of the methods and systems according to the invention. Rather, the preceding description affords one skilled in the art a guideline for implementation on the basis of at least one exemplary embodiment, whereby various modifications can be made, in particular with regard to the function and arrangement of the described components, without departing from the protective scope as results from the claims and equivalent combinations of features.

In particular, the individual features of the exemplary embodiments as depicted can be combined. For example, measuring elements 4a, 4b, 4c, 4d able to measure both the piezoelectric shear effect as well as also compressive forces by means of the piezoelectric effect can also be used in the first exemplary embodiments of FIGS. 1 and 2.

Furthermore, it is also possible to realize the inventive measuring arrangement with measuring elements 4a, 4b, 4c, 4d in a different arrangement in which only the piezoelectric effect is used to measure compressive forces. Even with measuring elements without an opening 6.

As already indicated with regard to various alternative embodiments for the individual exemplary embodiments, the piezoelements 4a, 4b, 4c, 4d as well as further piezoelements can also be arranged in a wide variety of advantageous arrangements.

For example, a fourth exemplary embodiment of FIG. 15 shows a further development of the piezoelement arrangement according to FIG. 2 with four arranged measuring elements 4a, 4b, 4c, 4d, these being particularly suitable for measuring a total torque Mz in respect of their orientation in the preferred direction $V_1$, $V_2$, $V_3$, $V_4$. Furthermore, the fourth exemplary embodiment comprises four further measuring elements 4e, 4f, 4g, 4h, their orientation in preferred direction $V_5$, $V_6$, $V_7$, $V_8$ being particularly well suited to measuring shear forces in the x-direction and y-direction of the Cartesian coordinate system.

Moreover, particularly the measuring device as per the third exemplary embodiment according to FIGS. 3 to 6 can be designed as a ring element. Furthermore, it can be designed so as to be able to be inserted into a groove together with a seal or is itself designed as a double-sided sealing element, in particular a sealing ring, for example for a bell housing 10 as is depicted in FIGS. 3 and 4.

In FIG. 8, a measuring device 1, as is used in electrical machine 2, can also be used on the wheel dynamometers 14a, 14b. Irrespective of the third exemplary embodiment of the measuring device 1 shown in FIG. 8, it is generally possible to use each inventive measuring device both on a dynamometer as well as on a drive unit of a test bench in order to enable an analysis of the behavior of both the dynamometer as well as the drive unit or their shafts 3 respectively.

Arranging the piezoelements 4a, 4b, 4c, 4d in a positive fit in the torque transmission path between the bearing apparatus 2 and the supporting apparatus 10 is also generally possible In this case, the piezoelectric measurement ensues via compressive and/or tensile forces on the piezoelements 4a, 4b, 4c, 4d.

As previously described with reference to FIGS. 12a to 14, the invention is suited to methods for determining a torque acting on the shaft or a force acting on a shaft when analyzing a wide variety of phenomena able to occur in conjunction with torque-bearing shafts.

One exemplary embodiment of such a method is depicted in FIG. 16.

In such a method, preferably at least one signal of a first piezoelement 4a; 4b and one signal of a second piezoelement 4c; 4d is first recorded 101. An applied torque Mz and/or occurrence of wobbling in the x-direction Fx and/or y-direction Fy and/or a torsional vibration of the shaft is derived 102 from these signals.

For torsional vibration measurement, preferably both signals on a drive shaft as well as on an output shaft are recorded and the respective torque oscillations are calculated on the basis of these measurements.

Further preferably, the signals are summed 103 correspondent to a component of the respective orientation of the preferred direction of the piezoelements 4a, 4c; 4b, 4d. It may therefore be necessary to split the individual measurement signals into their components in different spatial directions by means of vector decomposition.

An occurrence of torsional vibration of the shaft 3 can be derived 104a therefrom. Alternatively or additionally, reactive forces of a bearing can be derived 104b from the signals.

Preferably, discontinuities in the torque curve can be concluded 104c from a chronological sequence of the signals or from derived variables. Changes in properties of the system under testing can also be determined 104d. Furthermore, a progression can be projected into the future 104e-1 and the projected progression of potential overload of a bearing device 2 monitored 104e-2. Lastly, preferably output of an electrical machine 2 or dynamometers of a test bench can be adjusted should a projected overload be detected 104e-3.

In order to be able to calculate the torque Mz on the shaft as well as transverse forces Fx, Fy, preferably a vector decomposition, in particular an orthogonal decomposition, of the respective preferred direction $V_1$, $V_2$, $V_3$, $V_4$ of the piezoelements 4a, 4b, 4c, 4d, the measurement signals S1, S2, S3, S4 and/or the measured forces is performed.

The parameters Mz, Fx, Fy to be determined are thereby the solution to a system of equations, wherein an equation as follows applies to each measurement signal:

$$S1 = a_{11} \cdot Mz + a_{12} \cdot Fx + a_{13} \cdot Fy$$

$$S2 = a_{21} \cdot Mz + a_{22} \cdot Fx + a_{23} \cdot Fy$$

$$S3 = a_{31} \cdot Mz + a_{32} \cdot Fx + a_{33} \cdot Fy$$

.

.

.

$$SN = a_{N1} \cdot Mz \ldots$$

Each coefficient a thereby depends on multiple factors such as, for example, the respective position of the sensor and the orientation of the preferred direction $V_1$, $V_2$, $V_3$, $V_4$ in the reference system, a sensitivity of the respective piezoelement 4a, 4b, 4c, 4d, and a potential signal loss due to a force shunt from fixing means.

Solving such a system of equations for the torque component Mz, a first transverse force component Fx and a second transverse force component Fy requires measurement signals from at least three piezoelements 4a, 4b, 4c, with preferred directions $V_1$, $V_2$, $V_3$ oriented so as to lie in a single plane. Moreover, at least two of the preferred directions $V_1$, $V_2$, $V_3$ must not be in either parallel or antiparallel orientation.

For this general case described by N=3; i.e. with three piezoelements 4a, 4b, 4c, the solution to the above-depicted system of equations is unique. Should further piezoelements be added to the measuring system 1, the system of equations with three parameters Mz, Fx, Fy to be determined is overdetermined, although the measuring accuracy can be further improved.

In the case of N=4, four different systems of equations F (S1, S2, S3), F (S1, S2, S4), F (S1, S3, S4), F (S2, S3, S4) can be established. The values determined for the individual parameters Mz, Fx, Fy to be determined can then be totaled and averaged; i.e. divided by four in the case of four piezoelements 4a, 4b, 4c, 4d. Similarly, an overdetermined system of equations F (S1, S2 . . . , SN), which is solved by means of a minimization task, can be established.

If a general solution to the system of equations has been found, calculation of the components Fx, Fy, Mz to be determined can be reduced to matrix multiplication. Same has three rows and as many columns as available measuring signals S1, S2, S3, . . . SN. The matrix elements or coefficients respectively represent the respective contributions of the individual sensors to the parameters Fx, Fy, Mz to be determined.

$$\begin{pmatrix} Fx \\ Fy \\ Mz \end{pmatrix} = K \begin{pmatrix} c11 & c12 & c13 & c14 \\ c21 & c22 & c23 & c24 \\ c31 & c32 & c33 & c34 \end{pmatrix} \begin{pmatrix} s1 \\ s2 \\ s3 \\ s4 \end{pmatrix}$$

Decomposing the measurement signals S1, S2, S3, S4 into components contributing to the respective parameters Mz, Fx, Fy to be determined requires knowing the position of the piezoelements 4a, 4b, 4c and the orientation of the preferred directions $V_1$, $V_2$, $V_3$, Va.

The geometric parameters can be determined either from a design drawing of a measuring system 1 or from knowledge of the preferred directions of the piezoelements 4a, 4b, 4d.

The orientation of preferred directions $V_2$, $V_3$, $V_4$, $V_5$ of piezoelements 4a, 4b, 4c, 4d can however also be determined by determining the preferred directions $V_1$, $V_2$, $V_3$, $V_4$ by way of calibration measurement. Preferably, the measuring system 1 is to that end fixed between two flat plates. In a next step, external transverse forces with a known direction are applied. The preferred direction $V_1$, $V_2$, $V_3$, $V_4$ of the piezoelements 4a, 4b, 4c, 4d in the plane spanned by said preferred direction $V_1$, $V_2$, $V_3$, $V_4$ of the piezoelements 4a, 4b, 4c, 4d can be determined from the magnitude of the individual measurement signals S1, S2, S3, S4 relative to the magnitude and direction of the transverse forces introduced.

Similarly, by applying a defined torque Mz and measuring the individual measurement signals S1, S2, S3, S4, a respective distance of the piezoelements 4a, 4b, 4c, 4d from a rotational axis D can be determined when the preferred directions $V_1$, $V_2$, $V_3$, $V_4$ of the individual piezoelements 4a, 4b, 4c, 4d are known.

The described exemplary embodiments are merely examples which are in no way to be limiting of protective scope, application and configuration. Rather, the preceding description affords one skilled in the art a guideline for the implementation of at least one exemplary embodiment, whereby various modifications can be made, in particular with regard to the function and arrangement of the described components, without departing from the protective scope as results from the claims and equivalent combinations of features. In particular, individual exemplary embodiments can be combined with each other.

LIST OF REFERENCE NUMERALS measuring device 1
bearing apparatus 2
shaft 3
piezoelement 4, 4a, 4b, 4c, 4d
fixing device 5, 5a, 5b, 5c, 5d
opening 6
depression 7a, 7b, 7c, 7d
housing 8, 8a, 8b, 8c
measuring arrangement 9
supporting apparatus 10
transducer element 11a, 11b, 11c, 11d
fixing device cavity/supporting device cavity 12
gearbox and differential 13
wheel dynamometer 14a, 14b
test bench 15
sealing gap 16
end face 17a, 17b, 17c, 17d
surface 18a, 18b
electrode 19
piezoelectric crystal 20a, 20b
bore 21a, 21b, 21c, 21d
charge dissipator/electrical line 22, 22a, 22b, 22c, 22d

What is claimed is:

1. A measuring device for determining a torque on a torque-transmitting shaft which is supported by a bearing apparatus, an output shaft or an input shaft of the bearing apparatus being formed by the torque-transmitting shaft, the measuring device comprising:
    at least two piezoelements and a fixing device, wherein the fixing device supports the at least two piezoelements, and wherein the fixing device and the at least two piezoelements are, for determining the torque, configured to measure a shear force between the bearing apparatus and a supporting apparatus for supporting the bearing apparatus.

2. The measuring device according to claim 1, wherein the fixing device is configured such that the shear force is introducible parallel to end faces of the at least two piezoelements by way of a non-positive connection.

3. The measuring device according to claim 1, wherein the at least two piezoelements are connectable to the fixing device, the bearing apparatus, or the supporting apparatus by frictional connection.

4. The measuring device according to claim 1, wherein the at least two piezoelements are piezoelectric shear elements.

5. The measuring device according to claim 1, wherein the fixing device is configured such that the shear force is measurable at least substantially tangential to a rotational direction of the torque-transmitting shaft.

6. The measuring device according to claim 1, wherein the at least two piezoelements are arranged between the fixing device and the bearing apparatusbetween the fixing device and the supporting apparatus, or between the supporting apparatus and the bearing apparatus, and wherein the at least two piezoelements are loaded with an initial load.

7. The measuring device according to claim 1, wherein the fixing device is configured such that the bearing apparatus is supported solely by the at least two piezoelements in at least one rotational direction of the torque-transmitting shaft relative to the supporting apparatus.

8. The measuring device according to claim 1, wherein the at least two piezoelements are multi-component piezoelectric sensors and able to measure both a shear force as well as a compressive force.

9. The measuring device according to claim 1, wherein the at least two piezoelements includes at least three piezoelements, and wherein two or more of the at least three piezoelements are shear elements and at least one further piezoelement of the at least three piezoelements is a pressure element.

10. The measuring device according to claim 1, wherein the fixing device has an opening through which the torque-transmitting shaft can be guided.

11. The measuring device according to claim 10, wherein each piezoelement of the at least two piezoelements are arranged at approximately the same angular relationship with respect to a center of the opening.

12. The measuring device according to claim 1, wherein each piezoelement of the at least two piezoelements is more than 50% embedded in a respective depression of the fixing device, a housing part of the bearing apparatus, or the supporting apparatus.

13. The measuring device according to claim 1, wherein each piezoelement of the at least two piezoelements has a cavity through which a respective tensioning screw configured to connect the bearing apparatus to the supporting apparatus can be guided.

14. The measuring device according to claim 13, wherein the fixing device has a cavity which aligns with the cavity of a piezoelement of the at least two piezoelements and in which the tensioning screw can be seated.

15. The measuring device according to claim 1, wherein the fixing device is an adapter plate.

16. The measuring device according to claim 1, wherein the fixing device is a ring element, and wherein the ring element is either a seal between two components or is configured to be used together with a seal.

17. The measuring device according to claim 1, wherein the fixing device has at least two mounts supported on the supporting apparatus, and wherein at least some mounts of the at least two mounts can be arranged on opposite sides of a housing of the bearing apparatus so that a respective piezoelement of the at least two piezoelements lies between the at least some mounts and the housing.

18. The measuring device according to claim 17, wherein the at least two mounts includes at least three mounts, and wherein the at least three mounts are arranged on opposite sides of the housing to support the bearing apparatus.

19. The measuring device according to claim 17, wherein a transducer element is arranged between at least some mounts of the at least two mounts and the supporting apparatus, and wherein the transducer element is configured to measure a static force, a dynamic tensile force or a compressive force between the at least some mounts and the supporting apparatus.

20. A measuring arrangement for determining a torque on a torque-transmitting shaft, comprising:
a measuring device based on the piezoelectric effect, wherein the measuring device comprising at least two piezoelements and a fixing device, and wherein the fixing device supports the at least two piezoelements,
a shaft;
a bearing apparatus; and
a supporting apparatus of the bearing apparatus, wherein the bearing apparatus supports the shaft, wherein the measuring device does not alter a rotating mass of the shaft and/or a rotating mass of rotating parts of an aggregate comprised of the shaft and the bearing apparatus, and
wherein the fixing device and the at least two piezoelements are, for determining the torque, configured to measure a shear force between the bearing apparatus and the supporting apparatus.

21. The measuring arrangement according to claim 20, wherein the bearing apparatus is a machine.

22. The measuring arrangement according to claim 21, wherein the supporting apparatus is a bell housing.

23. The measuring arrangement according to claim 22, wherein the measuring device is a ring element fit on a sealing surface between the bell housing and the machine.

24. The measuring arrangement according to claim 20, wherein a paste is applied between the at least two piezoelements and the fixing device the bearing apparatus, or the supporting apparatus, for increasing a frictional coefficient.

25. The measuring arrangement according to claim 20, wherein the at least two piezoelements between the supporting apparatus and the bearing apparatus are loaded with a pretension of approximately 40 kN to 80 kN.

26. The measuring arrangement according to claim 20, wherein a housing part of the bearing apparatus also exhibits a cavity which aligns with a cavity of the at least two piezoelements and in which a tensioning screw is seated.

27. The measuring arrangement according to claim 20, wherein end faces of the at least two piezoelements are oriented at least substantially parallel to a surface of the bearing apparatus and a surface of the supporting apparatus.

28. A vehicle having a measuring arrangement according to claim 20.

29. A test bench having a measuring arrangement according to claim 20.

30. A test bench having a first measuring device according to claim 1 and a second measuring device according to claim 1, wherein the first measuring device is connected to a drive unit as the bearing apparatus of the first measuring device and the second measuring device is connected to a dynamometer as the bearing apparatus of the second measuring device.

31. A method for determining a torque applied to a shaft, wherein the torque is determined by measuring reactive forces of a bearing of a bearing apparatus of the shaft on the bearing apparatus via at least two piezoelements, wherein the reactive forces are measured as shear forces on the at least two piezoelements, and wherein a fixing device supports the at least two piezoelements, and wherein the fixing device and the at least two piezoelements are, for determining the torque, configured to measure the shear forces between the bearing apparatus and a supporting apparatus for supporting the bearing apparatus.

32. The method according to claim 31, wherein the measuring of the reactive forces is determined by a measuring arrangement, the method further comprising:
  detecting at least one signal of a first piezoelement of the at least two piezoelements and at least one signal of a second piezoelement of the at least two piezoelements; and
  deriving a torque acting on the first and second piezoelements or an occurrence of wobbling from signals including the at least one signal of the first piezoelement and the at least one signal of the second piezoelement.

33. The method according to claim 32, wherein the first and second piezoelements are oriented at a known direction relative to a rotational direction of the shaft, the method further comprising:
  totaling the signals corresponding to a component of the known direction of the first and second piezoelements in the rotational direction; and
  deriving an occurrence of torsional vibration of the shaft from the signals.

34. The method according to claim 32, wherein the first and second piezoelements are oriented parallel, the method further comprising:
  totaling the signals corresponding to a parallel component of the known direction of the first and second piezoelements; and
  deriving the reactive forces of the bearing from the signals.

35. The method according to claim 31, wherein the torque is a derived variable, and wherein a temporal change in at least the values of the derived variables is plotted.

36. The method according to claim 32, further comprising at least one of:
  checking the derived variables for discontinuities in a torque curve;
  checking the derived variables for changes in properties of a system under testing;
  projecting a progression of the derived variables;
  checking a projected course for an overload of the bearing apparatus; or
  adapting an output if one of the overload of the bearing apparatus, the discontinuities in the torque curve, or the changes in properties of the system under testing is identified.

37. A computer program containing commands which, when run by a computer, prompt the computer to execute the actions of the method according to claim 31.

38. A machine-readable medium on which a computer program according to claim 37 is stored.

39. A machine-readable medium containing commands which, when run by a computer, prompt the computer to execute the actions of the method according to claim 31.

* * * * *